(12) United States Patent
Sherwani et al.

(10) Patent No.: US 11,504,618 B2
(45) Date of Patent: Nov. 22, 2022

(54) SERVER-BASED VIDEO HELP IN A VIDEO GAME

(71) Applicant: SONY INTERACTIVE ENTERTAINMENT INC., Tokyo (JP)

(72) Inventors: Adil Ahmed Sherwani, Oakland, CA (US); Mischa G. Stephens, San Francisco, CA (US); Ai Sasho, Berkeley, CA (US); Xifan Chen, Fremont, CA (US); Nitin Y. Mohan, San Francisco, CA (US); Oscar Michael Sanchez, San Bruno, CA (US); Xiaohan Zhang, Albany, NY (US); Rui Li, Milpitas, CA (US); Gabor S. Melli, San Francisco, CA (US); Derek Andrew Parker, South San Francisco, CA (US); Jay Robert Franck, San Francisco, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/687,410

(22) Filed: Nov. 18, 2019

(65) Prior Publication Data
US 2021/0146244 A1    May 20, 2021

(51) Int. Cl.
*A63F 13/497* (2014.01)
*A63F 13/35* (2014.01)
(Continued)

(52) U.S. Cl.
CPC ............ *A63F 13/497* (2014.09); *A63F 13/35* (2014.09); *A63F 13/79* (2014.09); *A63F 13/85* (2014.09);
(Continued)

(58) Field of Classification Search
CPC ........ A63F 13/497; A63F 13/35; A63F 13/79; A63F 13/85; A63F 2300/305; A63F 2300/554
See application file for complete search history.

(56) References Cited

U.S. PATENT DOCUMENTS

| 10,223,449 B2 | 3/2019 | Smith et al. |
| 2013/0059634 A1* | 3/2013 | Behmaram-Mosavat ................... A63F 13/533 463/9 |

(Continued)

FOREIGN PATENT DOCUMENTS

EP    3513850 A2    7/2019

OTHER PUBLICATIONS

PCT/US2020/060729, "International Search Report and Written Opinion", dated Feb. 11, 2021, 15 pages.
(Continued)

*Primary Examiner* — Dmitry Suhol
*Assistant Examiner* — Jeffrey K Wong
(74) *Attorney, Agent, or Firm* — Kilpatrick Townsend & Stockton LLP

(57) ABSTRACT

Techniques for improving a user video game experience are described. In an example, a computer system receives event data from a plurality of user devices. Each event data includes an identifier of an activity in a video game and data indicating completion of the activity. The identifier can be predefined in program code of the video game. The identifier and completion data can be received based on an execution of the program code. The event data is processed to provide assistance videos to improve activity completion rates in the video game. The videos may be presented on the plurality of user devices.

19 Claims, 14 Drawing Sheets

(51) Int. Cl.
*A63F 13/79* (2014.01)
*A63F 13/85* (2014.01)

(52) U.S. Cl.
CPC ... *A63F 2300/305* (2013.01); *A63F 2300/554* (2013.01)

(56) References Cited

U.S. PATENT DOCUMENTS

| | | | |
|---|---|---|---|
| 2014/0349750 A1* | 11/2014 | Thompson | H04N 21/2358 463/31 |
| 2014/0370979 A1* | 12/2014 | Zahn | A63F 13/00 463/31 |
| 2017/0087460 A1 | 3/2017 | Perry | |
| 2017/0087475 A1* | 3/2017 | Perry | A63F 13/53 |
| 2017/0282079 A1 | 10/2017 | De La Cruz | |
| 2018/0001194 A1* | 1/2018 | Sherwani | A63F 13/79 |

OTHER PUBLICATIONS

PCT/US2020/060729, "International Preliminary Report on Patentability", dated Jun. 2, 2022, 11 pages.

\* cited by examiner

SERVER-BASED VIDEO HELP IN A VIDEO GAME

BACKGROUND

Video games are available on different computing devices. For example, a user operates a video game console and a mobile device to play a first video game and a second video game, respectively. In addition, video games are available from different sources. For example, the video game console is operable to play multiple video games from two or more different video game developers.

Given the increasing number of video games and their availability on different computing devices and from different sources, the user experience typically changes. For example, the way game play help may be sought can vary significantly between video games. In addition, the way a particular part of a video game is surfaced on a computing device as being available for playing can be unique to the particular video game.

Hence, the user experience may not be common between the video game players. There is a need for improving the user experience such that, regardless of the underlying video games, some commonality in video game functionalities becomes possible.

BRIEF SUMMARY

Techniques for improving a user video game experience are described. In an example, a computer system is used for presentation of video game-related information. The computer system includes one or more processors and one or more non-transitory computer readable storage media (e.g., one or more memories) storing instructions that, upon execution by the one or more processors, cause the computer system to perform operations.

In an example, the operations include accessing video content of a game play of a video game player in a video game. The video content is associated in a data store with an identifier of an activity completed by the video game player in the video game and with data indicating a start of the activity, an end of the activity, and an outcome of completing the activity. The identifier of the activity is included in program code of the video game. The operations also include determining that the data indicates that the outcome is a successful completion of the activity. The operations also include generating information about the activity. The information includes a link to a portion of the video content. The portion corresponds to the activity as shown in the video content or to a set of tasks within the activity. The operations also include presenting the information in a user interface to a user.

In an example, the operations further include recording the game play of the video game player as the video content, while recording the game play, receiving one or more events that include the identifier, the start, the end, and the outcome, generating one or more associations of the video content with the identifier and of the portion of the video content with the start and the end, and storing the one or more associations in the data store. In this example, the operations further include sending the video content to a content system based on a request of the video game player to share the video content, and storing, in the data store, an indication of the video content being shared. The link is included in the information based on the indication. Additionally, the information is presented in a window over video game content of the video game, and the operations further include receiving a user selection of the link presented in the window, and receiving the video content from the content system based on the selection. In this example, the operations further include presenting the video content of the game play over the video game content of the video game based on a user selection of the video content presented in the window. In this example, the window further includes at least one of: (i) a first option to present the video content of the game play adjacent to and simultaneously with a presentation of the video game content of the video game, or (ii) a second option to present the video content of the game play in a picture-in-picture window over and simultaneously with the presentation of the video game content of the video game. In this example, the window further includes a map that corresponds to a zone within the video game. The map indicates an estimated position of where a plurality of video game players completed the activity within the zone. In this example, the window further includes information about using a mechanic to complete the activity based on a history of use of the mechanic by a plurality of video game players.

In an example, the video content is further associated in the data store with an identifier of a mechanic used by the video game player to complete a task from the set of tasks of the activity. The portion of the video content corresponds to the task and shows the use of the mechanic.

In an example, the operations further include ranking the video content relative to one or more other video contents that show the activity. The video content is ranked based on a language setting of the video game player and a language setting of the user. The operations further include selecting the video content to be included in the information based on the ranking.

In an example, the portion of the video content shows a use of a mechanic by the video game player to complete the activity. In this example, the operations further include ranking the video content relative to one or more other video contents that show the activity. The video content is ranked based on an availability of the mechanic to the user.

In an example, the operations further include ranking the video content relative to one or more other video contents that show the activity. The video content is ranked based on a characteristic of the video game player in the video game and a characteristic of the user in the video game.

In an example, the operations further include ranking the video content relative to one or more other video contents that show the activity. The video content is ranked based on a difficulty setting associated with the game play of the video game player in the video game and a difficulty setting associated with a game play of the user in the video game.

In an example, the start and the end of the activity indicate a completion time of the activity by the video game player. In this example, the operations further include ranking the video content relative to one or more other video contents that show the activity. The video content is ranked based on the completion time.

In an example, the operations further include ranking he video content relative to one or more other video contents that show the activity. The video content is ranked based on microphone audio of the video game player being available with the video content.

In an example, the operations further include determining a success rate of the video content. The success rate is determined by at least: receiving, after a presentation of the video content to a second video game player and before receipt of another identifier of a different activity completed by the second video game player in the video game, second data including the identifier of the activity and indicating a successful completion of the activity by the second video game player, and updating the success rate based on the second data. In this example, the operations further include ranking the video content relative to one or more other video contents that show the activity. The video content is ranked based on the success rate.

In an example, the activity is a task from a plurality of tasks that form a second activity. In this example, the operations further include presenting, in the user interface, a window in a first state. The window identifies the second activity and presented over video game content of the video game. The operations further include presenting the window in an expanded state upon a user selection of the second activity. The window in the expanded state identifies the tasks of the second activity. The operations further include updating the window in the expanded state to show the information about the activity upon a user selection of the activity from the tasks of the second activity. In this example, the window is updated to further show at least one of (i) a map within a zone of the video game to complete the activity or (ii) second information about using a mechanic to complete the activity. The at least one of (i) the map or (ii) the second information are shown simultaneously with the link to the portion of the video content.

DETAILED DESCRIPTION

Figure 1:
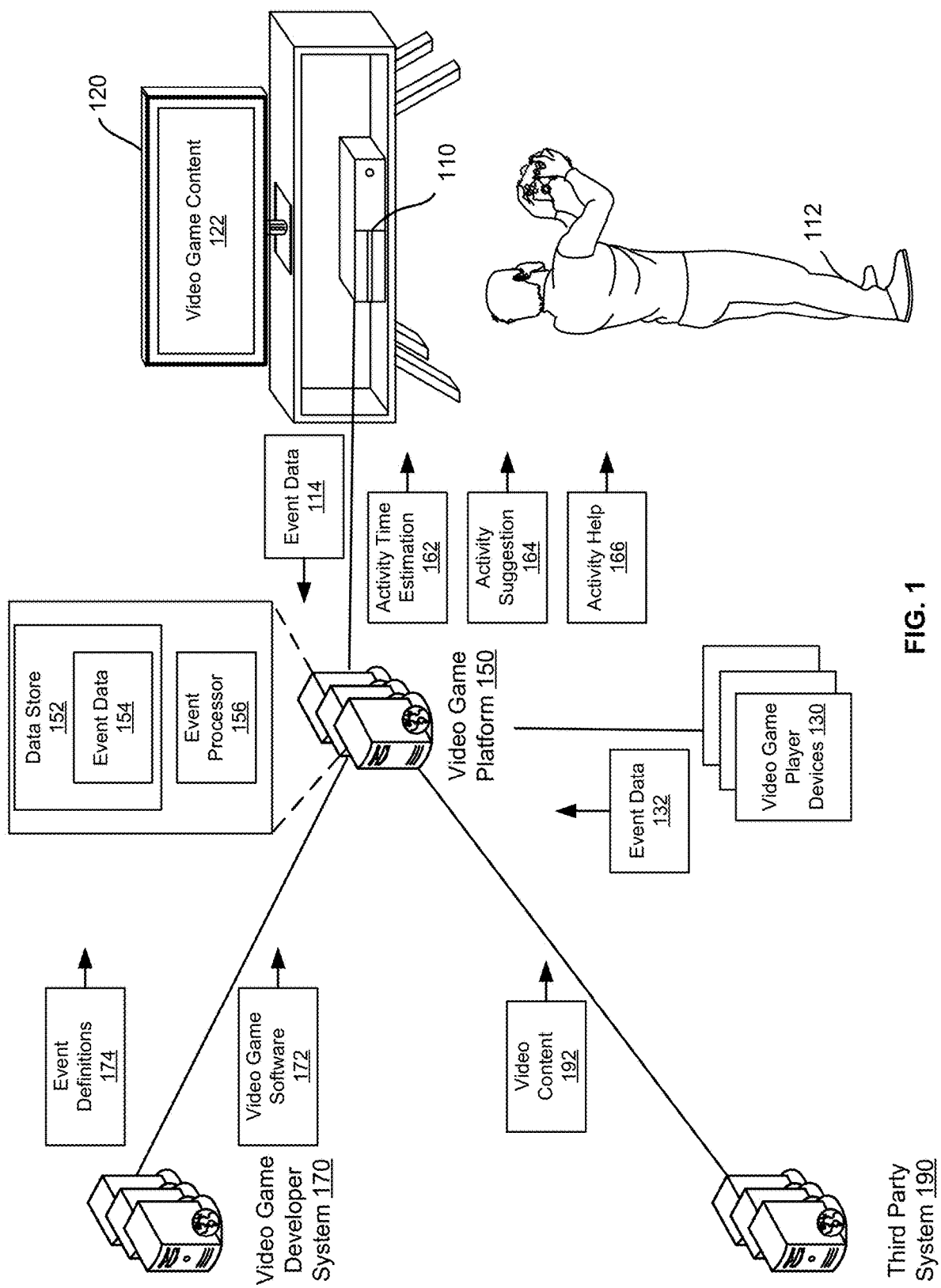
FIG. 1 illustrates an example of a computing environment for collecting and processing video game events, according to embodiments of the present disclosure.

Generally, systems and methods for improving a user video game experience are described. In an example, the user video game experience is improved by providing a unified way for, among other things, multiple video game functionalities, such as for suggesting video game activities, estimating completion time for such activities, and presenting video game help regardless of the underlying video games. This unified way need not change how a video game is developed or necessitate a common approach to video game development. Instead, instrumentation of various events in the video games is relied upon, where a video game platform (e.g., a server-based video game service) can collect and process such events based on the execution of the video games to suggest the video game activities, estimate completion times, and present the video game helps at a client level and, as needed, to customize such video game functionalities to the client level.

For instance, a video game includes a plurality of activities. When an instance of the video game is executed for a video game player (whether locally on a computing device of the video game player or remotely on the video game platform), the video game platform receives events about played activities and recorded video content showing how the video game player played these activities. The video game platform stores such events as event data. For event data associated with a played activity, the event data includes an activity identifier of the activity and indicates type, its start time, its end time, and/or potentially its outcome (e.g., success or failure). Based on timing information from the event data (e.g., start and end) and timing information of the video content, the video game platform determines the portion of the video content that shows the played activity and associates this portion with the activity.

For instance, while receiving the video content showing a game play of a video game by a video game player, the video game platform receives a first event at time "$t_1$" and a second event at time "$t_2$". The first event includes an activity identifier of an activity A in the video game and indicates its start. The second event includes the same activity identifier of activity A and indicates its end and successful completion. Accordingly, the video game platform determines that activity A was played between times "$t_1$" and "$t_2$" and associates the portion of the video content between times "$t_1$" and "$t_2$" with the activity identifier and with a successful completion, thereby indicating that this video portion shows the activity being successfully played. The association enables the video game platform to link activity A to the video portion. In particular, the video game platform may generate a link to the keyframes in the video content at the start and end timestamps (e.g., times "$t_1$" and "$t_2$").

In an example, a user operating a computing device may not have played activity A before, may not have successfully completed it yet, or may desire to view how other video game players have played activity A. A request for help may be received from the computing device. In response, the video game platform may send the link with information identifying activity A to the computing device. By selecting the link, the video portion is displayed to the user and shows how activity A was played.

In an example, the video game platform may associate multiple video portions from different video content of multiple video game players with the same activity (e.g., activity A) in a video game. Upon receiving a request from a computing device of a user for help about the activity, The video game platform ranks the video portions for the user based on a set of factors and selects one or more of these video portions to return based on the ranking. For a selected video portion, the video game platform returns the corresponding link. These factors relate to the video game players, the user, context(s) of the video game players and/or the user in the video game, and/or context(s) of the video game players and/or the user on the video game platform. The ranking can involve generating a relevance score per video portion given how the sort factors are met and sorting the video portions based on their relevance scores.

Embodiments of the present disclosure provide many technical advantages over existing video game platforms. For instance, functionalities of a graphical user interface (GUI) are improved. In particular, by collecting events per activity, video game, and video game player, a video game platform of the present disclosure can provide relevant assistance in the GUI and improve the quality of game play.

FIG. 1 illustrates an example of a computing environment for collecting and processing video game events, according to embodiments of the present disclosure. As illustrated, the computing environment includes a video game console 110, video game player devices 130, a video game platform 150, a video game developer system 170, and a third party system 190. Video games are available to the video game console 110 from the video game developer system 170 through the video game platform 150. Video content, such as help videos demonstrating how video game activities can be played, is also available to the video game console 110 from the third party system 190 through the video game platform 150. The video game platform 150 collects, stores, and processes events from the video game player devices 130 and the video game console 110 to provide various video game-related functionalities including, for instance, suggesting video game activities, estimating completion time for such activities, and presenting video game help.

In an example, the video game console 110 represents a computing device available to a user 112 and operable to interact with one or more applications including video games. A display 120 communicatively coupled or integrated with the video game console 110 can present video game-related data, including video game content 122, to the user 112. Other types of computing devices can be available to the user 112 including, for instance, a smartphone, a tablet, a laptop, a desktop computer, or other devices with suitable memories and processors.

The video game console 110 can execute a video game locally to present the video game content 122 on the display 120. Additionally or alternatively, the video game consoles 110 can receive the video game content 122 based on an execution of an instance of the video game application on the video game platform 150, the video game developer system 170, or another remote computer system. The video game can also be downloadable to the video game console 110 from such systems.

Further, the video game console 110 can, directly or through the video game platform 150, download or stream video content from the third party system 190 for presentation on the display 120. An example of video content includes a video file generated by the video game developer 170 and uploaded to the third party system 190, where this video file demonstrates how a video game can be played, a set of activities in the video game can be played, or a set of mechanics in an activity can be used to play the activity. A mechanic generally represents at least one of a set of tools, a set of capabilities, or a set of skills available to play an activity or a portion of an activity. Another example of video content includes a video file generated by one of the video game player devices and uploaded to the third party system 190 directly or through the video game platform 190, where the video file records the game play of a video game player operating the video game player device. Likewise, a similar video file can be uploaded to the third party system 190 from the video game console 110.

In an example, the video game player devices 130 represent computing devices of video game players that may, but need not, include the user 112. Similar functionalities can be provided on each one of the video game player devices and the video game console 110.

In an example, the video game system 170 represents a computer system that includes a set of computing resources for developing video games and available to a video game developer. In particular, the video game system 170 can store video game software 172, upload such software 172 to the video game platform 150, and/or download such software 172 to the video game console 110.

The video game software 172 of a video game is program code executable to present and interact with video game content of the video game. The program code can include predefined instrumentations to generate events upon the execution of the program code. In particular, the program code includes a set of event definitions 174, where an event definition represents code defining an identifier of an event and data to be reported for the event. Examples of such event definitions 174 are further described herein below and are predefined in the program code of the video game according to event templates available from the video game platform 150. Such event templates can be defined by a service provider of the video game platform 150 and can be commonly used across multiple video game developer systems 170.

In an example, the third party system 190 represents a computer system, such as one or more content servers, for providing video content 192 to the video game console 110 directly or indirectly through the video game platform 150. As explained herein above, the video content 192 can include video files demonstrating how a video game can be played, a set of activities in the video game can be played, or a set of mechanics in an activity can be used to play the activity. The video content 192 can be uploaded to the third party system 190 from the video game developer system 170, the video game console 110, and/or one or more of the video game player devices 130 directly or indirectly through the video game platform 150.

In an example, the video game platform 150 represents a computer system that provides various video-game related functionalities to the video game console 110. For instance, the video game platform 150 is set-up as a hub between the video game console 110, the video game player devices 130, the video game developer system 170, and third party system 190. In particular, the video game software 172 and the video content 192 can be downloaded to the video game consoler 110 through the video game platform 150. An instance of a video game based on video game software stored on the video game platform 150 can be instantiated for the video game console 110. A video file can be streamed through the video game platform 150 to the video game console 110. In addition, communications data (e.g., messages, commands, etc.) can be exchanged between the video game console 110 and the video game player devices 130 through the video game platform 150.

Furthermore, the video game platform receives event data 114 from the video game console 110 and event data 132 from the video game player devices 130 and stores such received data in a data store 152 as event data 154. An event processor 156 of the video game platform 150 processes the event data 154 to generate and send any of an activity time estimation 162, an activity suggestion 164, and an activity help 166 to the video game console 110 for presentation on the display 120.

Received event data (any of the event data 114 or event data 132) represents data reported from a device (e.g., the video game console 110 or one of the video game player devices 130 as application) for an event based on an execution of program code of a video game, where the program code includes an event definition for the event. The activity time estimation 162 represents an estimated length of time to complete an activity in the video game, which may be referred to herein as completion time. The activity suggestion 164 represents information suggesting an activity available to the user 112 in the video game and not previously performed or completed by the user 112. An activity help 166 includes information, such as a video file, textual description, and/or a graphical description about completing an activity in the video game or using a mechanic in at least a portion of the activity. The processor 156 executes logic that, for instance, performs a statistical analysis across a subset of the event data 154 associated with the activity to generate the activity time estimation 162, the activity suggestion 164, and the activity help 166. In addition, the processor 156 can execute logic that customizes any of the activity time estimation 162, the activity suggestion 164, or the activity help 166 based on a context of the user 112 in the video game and/or within the platform and on the type of the video game console 110.

Generally, an activity is a unit of game play inherent to the structure of a video game. Different categories of activities exist including progress activities, competitive activities, challenge activities, and open-ended activities. The activity can be defined in a program code as object with multiple properties. The properties include an activity identifier, a name, and a category. The activity identifier is a unique identifier of the activity. When an event about the activity is reported to the video game platform 150, the corresponding event data refers to the activity identifier. The name can be a short localized name of the activity. Other properties are possible including, for instance, a description (e.g., a longer description of the activity), an image of the activity, a default availability (e.g., whether the activity is available to all video game players before launching the video game), whether completion of the activity is required to complete the video game, whether the activity can be played repeatedly in the video game, and nested tasks (child activities, also referred to herein as sub-activities). Multiple events about the activity are possible.

An example of an event about the activity can indicate changes in activity availability for a video game player (e.g., the user 112). This is primarily used to decide what activities to display and to remove spoiler block for those activities (where an activity having a spoiler may not be surfaced to the video game player). A property of this event includes, for instance, a list (e.g., array) of activities that are currently available.

An example of an event about the activity can indicate that the video player is currently participating in the activity or task (e.g., a child activity). A property of this event includes, for instance, the activity identifier of the activity. Another property can optionally be a time corresponding to the start of the participation in the activity.

An example of an event about the activity can indicate the end of the activity or task (e.g., a child activity). A property of this event includes, for instance, the activity identifier of the activity. Another property can optionally be a time corresponding to the end of the participation in the activity. Yet another property can optionally be an outcome of the activity, such as completed, failed, or abandoned.

The video game platform 150 can also collect data about a zone in a video game, where this data is reported similarly to the events based on predefinitions in program code of the video game. The zone represents an area of a game world of the video game (e.g., a virtual world) with a single coordinate system. The zone may have a two-dimensional (2-D) map image associated with it, used to display locations on the zone. The zone can be defined in the program code as an object with multiple properties. The properties include a zone identifier and a name. The zone identifier is a unique identifier of the zone. The name can be a short, localizable name of the zone. Other properties are possible including, for instance, an indication of whether the object should be treated as hidden for spoiler block uses cases (the default may be set to false), a map (e.g., a high resolution image for the zone 2-D map), a view projection (e.g., a matrix (4×4) to convert from three-dimensional (3-D) work coordinates to 2-D map position), and an image (e.g., a display image for the zone if different from the map). Multiple events about the zone are possible.

An example of an event about the zone can indicate an update to the current in-game location of the video game player. This event can be reported regularly, or whenever the player's in-game location changes significantly. A property of this event includes the zone identifier. Other properties are possible, such as optionally position (e.g., x,y,z position of the video game player character (the virtual player of the video game player) in the zone) and orientation (e.g., x,y,z vector indicating the video game player character's direction).

Another example of an event about the zone can indicate the video game player's zone, location, and orientation, at the time of starting the activity. This event can enable location-based help. A property of this event includes the activity identifier. Other properties are possible, such as optionally the zone identifier and the position and orientation of video game player's character in the video game.

Yet another example of an event about the zone can indicate the video game player's zone, location, and orientation, at the time of ending the activity. This event can also enable location-based help. A property of this event includes the activity identifier. Other properties are possible, such as optionally the outcome of the activity, the zone identifier, and the position and orientation of video game player's character in the video game.

The video game platform 150 can also collect data about an actor in a video game, where this data is reported similarly to the events based on predefinitions in program code of the video game. The actor represents an entity with behaviors in the video game. The actor can be player-controlled or game-controlled, and this can change dynamically during game play. The actor can be defined in the program code as an object with multiple properties. The properties include an actor identifier and a name. The actor identifier is a unique identifier of the actor. The name can be a localizable name of the actor. Other properties are possible including, for instance, an indication of whether the object should be treated as hidden for spoiler block uses cases (the default may be set to false), an image of the actor, and a short description of the actor. Multiple events about the actor are possible.

An example of an event about the actor can indicate that a change to the video game player's selection of actor(s). Selected actors represent the actors the video game player is controlling in the video game, and can be displayed on the video game player's profile and other presentation spaces. There can be more than one actor selected at a time. The video game should replace the list of actors upon loading save data. A property of this event includes a list (e.g., array) of actors which are currently selected by the video game player.

The video game platform 150 can also collect data about a mechanic in a video game, where this data is reported similarly to the events based on predefinitions in program code of the video game. The mechanic represents an item (e.g., tool), capability, skill, or effect that can be used by the video game player or the video game to impact game play (e.g. bow, arrow, stealth attack, fire damage). The mechanic generally excludes items that do not impact game play (e.g. collectibles). The mechanic can be defined in the program code as an object with multiple properties. The properties include a mechanic identifier and a name. The mechanic identifier is a unique identifier of the mechanic. The name can be a short, localizable name of the mechanic. Other properties are possible including, for instance, an indication of whether the object should be treated as hidden for spoiler block uses cases (the default may be set to false), an image of the mechanic, and a short description of the mechanic. Multiple events about the mechanic are possible.

An example of an event about the mechanic can indicate that mechanics available to the video game player have changed. Availability of a mechanic represents that the mechanic is available in the game world for the video game player to use, but may necessitate the video game player to go through some steps to acquire it into inventory (e.g. download from a store, pick up from the world) before using it. This event can also be used to indicate lifting of spoiler block on the mechanic object, and to filter help tips to avoid suggesting use of a mechanic that is unavailable. The video game should replace the list of mechanics upon loading save data. A property of this event includes a list (e.g., array) of mechanics which are currently available.

Another example of an event about the mechanic can indicate that the video game player's inventory has changed. Inventory refers to mechanics that are immediately usable to the video game player without having to take additional steps in the video game before using it. Inventory information can be used to estimate a player's readiness for an activity. The video game should replace the list of inventory upon loading save data. A property of this event includes a list (e.g., array) of mechanics which are currently in inventory.

Yet another example of an event about the mechanic can indicate that the video game player's load out has changed. Load out represents the mechanics that are most immediately accessible to the video player, and is the subset of inventory which is displayable to the video game player. The video game should replace the list of mechanics upon loading save data. A property of this event includes a list (e.g., array) of mechanics which are now part of the active load out.

A further example of an event about the mechanic can indicate that the mechanic has been used by or against the video game player. Properties of this event include a list (e.g., array) of mechanics which were used (e.g. fire arrow, fire damage) and whether the mechanics were used by or against the video game player. Other properties are possible, such as optionally an initiator actor identifier (e.g., an identifier of the actor that initiated the use of the mechanic), a zone identifier of the initiator actor, and a position of the initiator actor.

Another example of an event about the mechanic can indicate that the mechanic had an impact on game play (e.g. an arrow hit a target). Properties of this event include a list (e.g., array) of mechanics which were used (e.g. fire arrow, fire damage) and whether the mechanics were used by or against the video game player. Other properties are possible, such as optionally the initiator actor identifier, the zone identifier of the initiator actor, the position of the initiator actor, a target actor identifier (e.g., an identifier of the actor targeted by the mechanic), a zone identifier of the target, a position of the target actor, and an identifier of a mechanic that mitigates the initiator's mechanic(s).

The video game platform 150 can also collect data about game media in a video game, where this data is reported similarly to the events based on predefinitions in program code of the video game. The game media represents a piece of media (text, audio, video, image) related to the video game, provided by the game developer. The game media may exist in-game (e.g. cut-scene, audio log, book) or may not (e.g. developer commentary). The game media can be defined in the program code as an object with multiple properties. The properties include a game media identifier, a name, a format, a category, an unlock rule, and a uniform resource locator (URL). The game media identifier is a unique identifier of the game media. The name can be a localizable name of the game media. The format can indicate the media format, such as whether the game media is an image, audio, video, text, etc. The category indicates a type of the game media, such as whether the game media is a cut-scene, audio-log, poster, developer commentary, etc. The unlock rule indicates whether the game media should be unlocked for all video game players or based on an activity or a specific game media event. The URL references a server-provisioned media file, where this server can be part of the game developer system 170 or the video game platform 150. Other properties are possible including, for instance, an indication of whether the object should be treated as hidden for spoiler block use cases (the default may be set to false), an entitlement (e.g., indicating that only video game players who own a particular video game entitlement can unlock the game media), and an activity identifier (e.g., to associate the game media with a particular activity). Multiple events about the game media are possible.

An example of an event about the game media can indicate that a particular piece of game media has been unlocked for the video game player. A property of this event includes the game media identifier.

Another example of an event about the game media can indicate that a particular piece of game media has started in the video game. The game media object should be considered unlocked for the video game player at the corresponding time. A property of this event includes the game media identifier.

Yet another example of an event about the game media can indicate that a particular piece of game media has ended in the video game. A property of this event includes the game media identifier.

Figure 2:
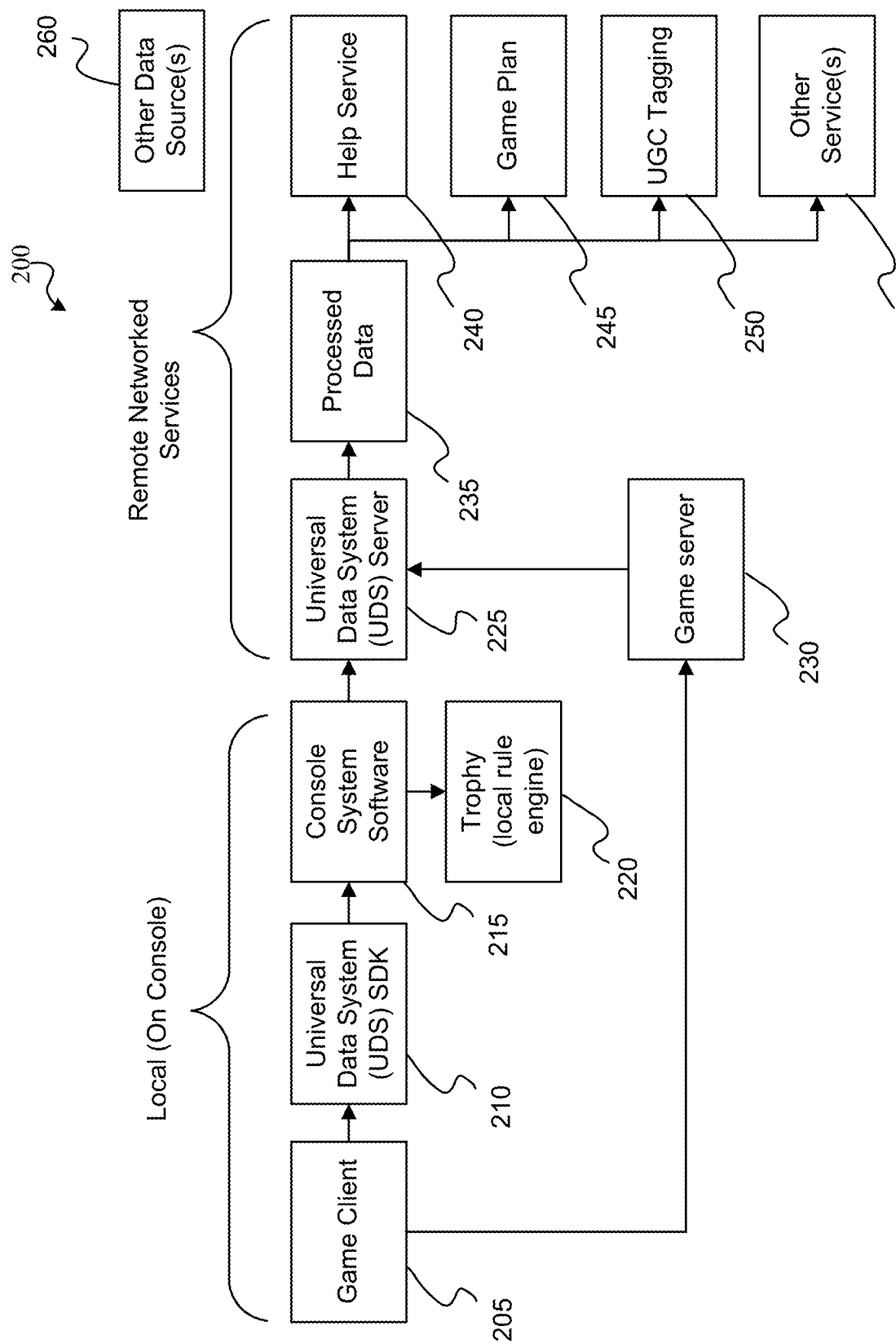
FIG. 2 illustrates an example of a system architecture for providing users with contextual information regarding available game activities, according to embodiments of the present disclosure.

FIG. 2 illustrates an example of a system architecture for providing users with contextual information regarding available game activities, according to embodiments of the present disclosure. In some embodiments, the exemplary system architecture 200 includes a game client 205, a universal data system (UDS) software development kit (SDK) 210, console system software 215, a local rule engine 220, a UDS server 225, a game server 230, processed data 235, and one or more other remote networked services, including a help service 240, game plan 245, user generated content (UGC) tagging 250, and other service(s) 255. The help service 240 may also receive information from other data source(s) 260. Some of the components of the system architecture 200 are examples of components of the video game platform 150 of FIG. 1. For instance, the UDS server 225 and the game server 230 are components of the video game platform 150.

The game client 205 and game server 230 provide contextual information regarding at least one application to a universal data system (UDS) server 225 via a UDS data model describing the logical structure of UDS data used by the UDS SDK 210. The UDS data model enables the platform (e.g., the video game platform 150) to realize remote networked services, such as the help service 240, game plan 245, UGC tagging 250, and other service(s) 255 that require game data, without requiring a game to be patched separately to support a service. The UDS data model assigns contextual information to a portion of information in a unified way across games. The contextual information from the game client 205 and UDS SDK 210 is provided to the UDS server 225 via the console system software 215. It is to be understood that the game client 205, UDS SDK 210, console system software 215, and local rule engine 220 may run on a computer or other suitable hardware for executing at least one application.

The UDS server 225 receives and stores contextual information from the game client 205 and game server 230 from at least one application. To be sure, the UDS server 225 may receive contextual information from a plurality of game clients and game servers for multiple users. The information may be uniformly processed 235 and then received by the plurality of remote networked services 240, 245, 250, and 255.

Figure 3:
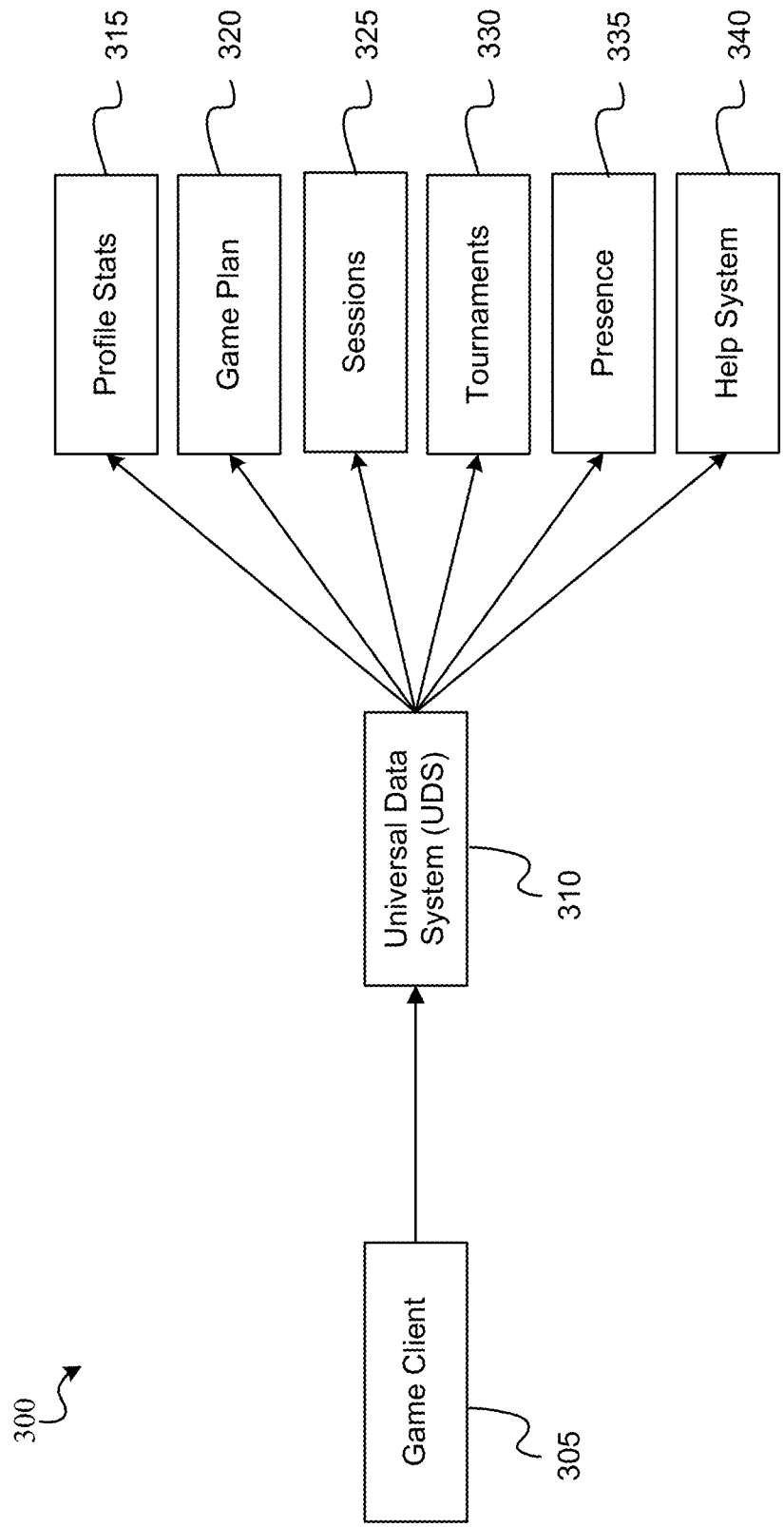
FIG. 3 illustrates another example of a system architecture, according to embodiments of the present disclosure.

FIG. 3 illustrates another example of a system architecture 300, according to embodiments of the present disclosure. A game client 305 sends contextual information to a UDS server 310, which provides the contextual information in a unified data model to a plurality of remote networked services, including profile stats 315, game plan 320, sessions 325, tournaments 330, presence 335, and help system 340.

Figure 4:
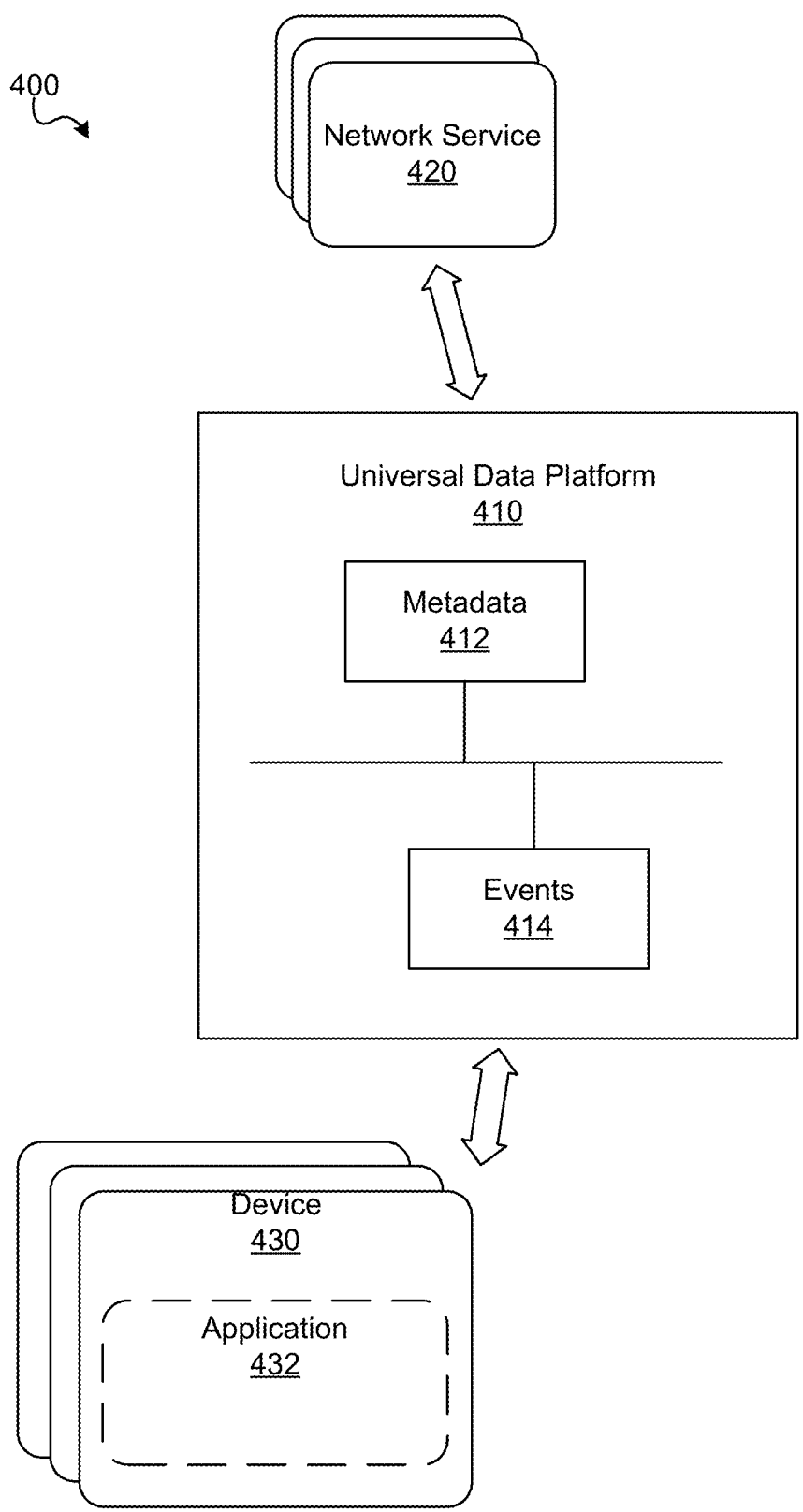
FIG. 4 illustrates an example of a system for providing a data model for a universal data platform, according to embodiments of the present disclosure.

FIG. 4 illustrates an example of a system 400 for providing a data model for a universal data platform 410, according to embodiments of the present disclosure. Some of the components of universal data platform 410 are examples of components of the video game platform 150 of FIG. 1. In one example embodiment, system 400 can include at least one device 430 configured to execute at least one of a plurality of applications 432, each application having an application data structure. The universal data platform 410 can be executed on one or more servers. The universal data platform 410 can include a data model which is uniform across the plurality of application data structures. The data model can include metadata 412 corresponding to at least one object indicated in the data model, and events 414 corresponding to a trigger condition associated with at least one metadata entry. The values of the metadata 412 and events 414 can be associated with a user profile. The universal data platform 410 can be configured to receive application data from the at least one device 430 and store the application data within the data model. The system 400 can also include a plurality of remote networked services 420 configured to access the application data from the universal data platform 410 using the data model.

In various embodiments, the metadata 412 may include: a list of all activities that a user can do in an application, an activity name, a description of the activity, a state of the activity (whether available, started, or completed), whether the activity is required to complete an objective or campaign, a completion reward for the activity, an intro or outro cut-scene, an in-game location, one or more conditions that must be met before the activity becomes available, and a parent activity that contains the activity as a sub-activity. Metadata 412 may further include: a list of abilities exercisable by the user, effects of each action, telemetry indicative of when actions and effects take place including corresponding timestamps and locations, an in-game coordinate system, a list of in-game branch situations, and telemetry indicative of when a branch situation is encountered and which option is selected by the user. A list of in-game statistics, items, lore, in-game zones and corresponding attributes regarding each statistic, item, lore, or zone may likewise be included in the metadata 412. In addition, the metadata 412 may indicate whether or not a particular activity, entity (such as a character, item, ability, etc.), setting, outcome, action, effect, location, or attribute should be marked as hidden.

Events 414 may be fired in response to several various trigger conditions. For example, such trigger conditions may include: an activity that was previously unavailable becomes available, a user starts an activity, a user ends an activity, an opening or ending cut-scene for an activity begins or ends, the user's in-game location or zone changes, an in-game statistic changes, an item or lore is acquired, an action is performed, an effect occurs, the user interacts with a character, item, or other in-game entity, and an activity, entity, setting, outcome, action, effect, location, or attribute is discovered. The events 414 may include further information regarding a state of the application when the events 414 were triggered, for example a timestamp, a difficulty setting and character statistics at the time a user starts or ends an activity, success or failure of an activity, or a score or duration of time associated with a completed activity. It is to be understood that metadata 412 and events 414 may include any and all contextual information related to activities described in the present disclosure.

Figure 5:
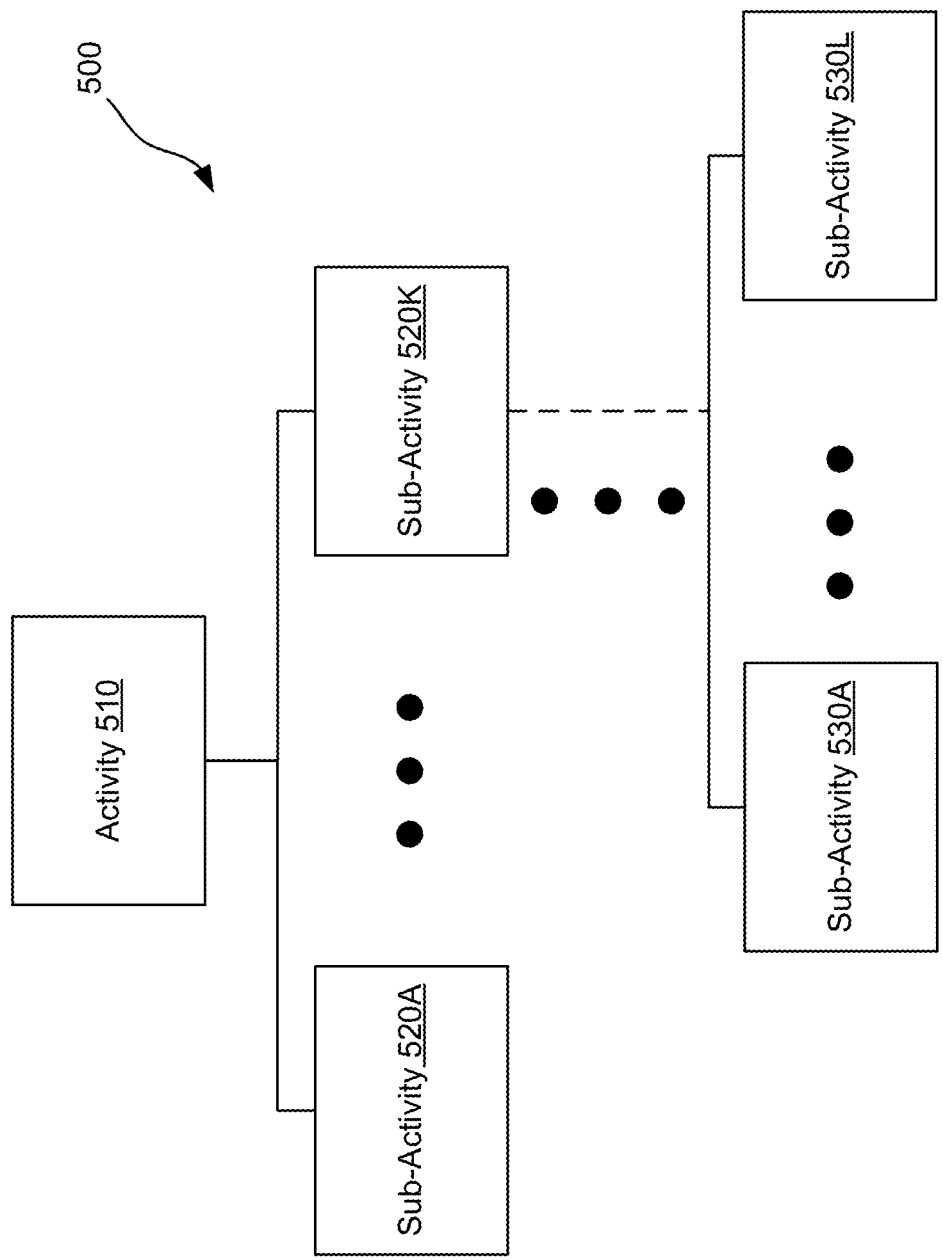
FIG. 5 illustrates an example of an activity hierarchy, according to embodiments of the present disclosure.

FIG. 5 illustrates an example of an activity hierarchy, according to embodiments of the present disclosure. As illustrated, an activity 510 can include multiple nested tasks, referred to herein as sub-activities, forming a hierarchy 500. The activity 510 can be a node on top of the hierarchy 500 (e.g., a root node) and can have a set of child sub-activities 520A-520K at the next level of the hierarchy 500. In turn, each one of the sub-activities 520A-520K may be a child node of the activity 510 and, possible, a parent node to a set of sub-activities at the next hierarchy level. For instance, the sub-activity 520K is a parent node to a set of sub-activities 530A-530L. This type of association between nodes, each representing a sub-activity, can be repeated at the different levels of the hierarchy 500. A set of mechanics can be associated with each node indicating that such mechanic(s) can be available or usable in the activity corresponding to the node.

As explained herein above, the activity 510 has an activity identifier. Each sub-activity also represents an activity and, thus, has an activity identifier too. Likewise, each of the mechanics has a mechanic identifier. Associations between the activity identifiers themselves and between the activity identifiers and the mechanic identifiers can be defined based on the hierarchy 500. Such associations can be stored in objects that define the activities (or sub-activities) and/or that define the mechanics and/or can be stored in events that relate to such objects. For instance, the activity identifier of the sub-activity 520K can be associated with the activity identifier of the activity 510 and/or the activity identifiers of the sub-activities 530A-530L. Similarly, the activity identifier of the sub-activity 530L can be associated with the activity identifier of the sub-activity 520L and/or the mechanic identifiers of the mechanics 540A-540M. Further, a mechanic identifier of a mechanic can be associated with an activity identifier.

Figure 6:
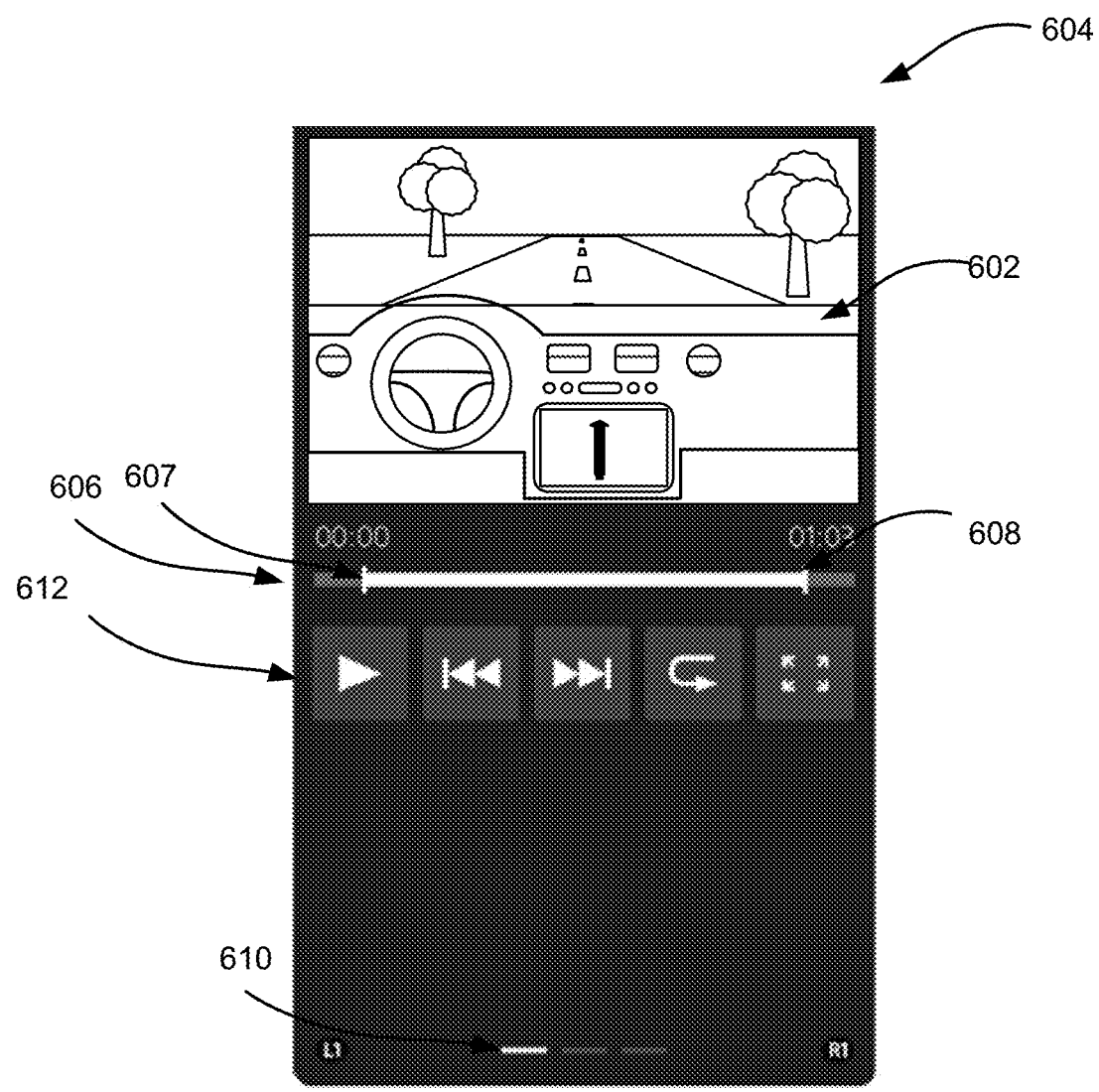
FIG. 6 illustrates an example of a user interface presented by a video game console, according to embodiments of the present disclosure.

FIG. 6 illustrates an example of a user interface presented by a video game console (e.g., the video game console 110 of FIG. 1), according to embodiments of the present disclosure. The user interface 604 presents a portion of video content 602 associated with an activity identifier of an activity in a video game. This video portion is received from a video game platform (e.g., the video game platform 150 of FIG. 1) and shows how the activity can be played.

As illustrated by FIG. 6, the portion of video content 602 that is associated with the activity identifier is indicated by the playback bar 606 with a portion start point 607 and a portion end point 608. In certain cases, multiple video portions can show the activity and can correspond to different video game content of multiple video game players (e.g., video portions corresponding to game plays of different video game players). The video game platform may generate multiple links, each link being to one of the video portions from different video content showing the activity, Based on a ranking of such video portions, the user interface 604 presents the video portions in different pages and these pages can be accessed by interacting with a selection bar 610. In the example illustrated by FIG. 6, the three video portions can be shown in the user interface 604. In FIG. 6, a first video portion is selected for presentation, however, the user interface 604 can receive user input (e.g., a mouse-click, a controller button, a touch gesture) at the selection bar 610 to select the second video portion or the third video portion. The user interface 604 indicates the selected portion of video content by adjusting the selection bar 610 (e.g., illuminating the second dash or the third dash of the selection bar 610, respectively).

The user interface 604 may also receive control inputs from a video game player by receiving a selection of one or more of replay controls 612 that enable the user to play, rewind, fast forward, loop, or adjust the size of the portion of video content 602 (e.g., full screen, half screen, etc.). Other data can be shown in the user interface 604. For instance, the user interface 604 can present simultaneously with the portion of video content 602, a map that corresponds to a zone within the video game and/or information (e.g., text) about using a mechanic to complete the activity. The map indicates an estimated position of where a plurality of video game players completed the activity within the zone and can be generated from event data of such players showing activity ends of the activity at certain positions within the zone.

Figure 7:
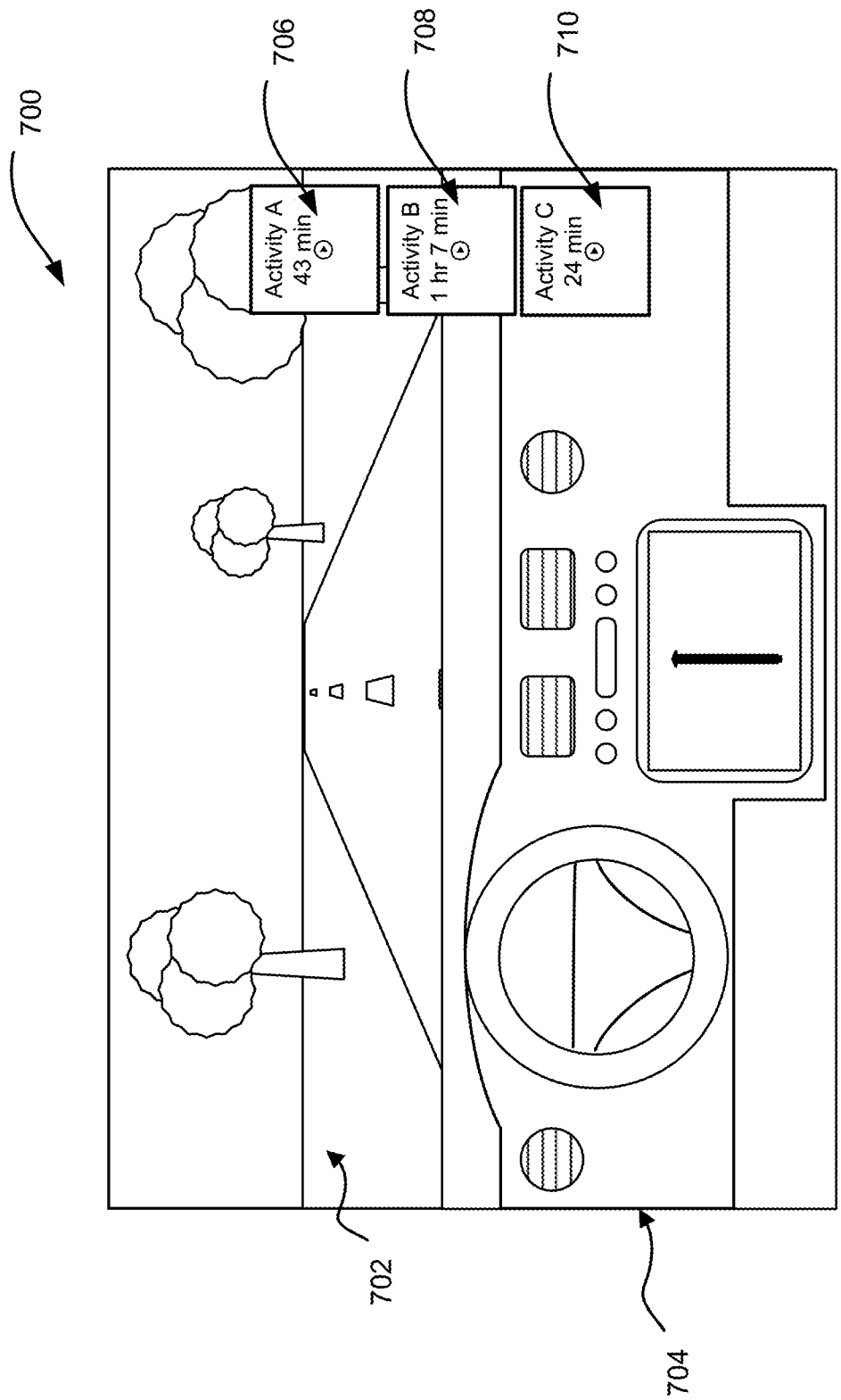
FIG. 7 illustrates a user interface presented on a display, according to embodiments of the present disclosure.

FIG. 7 illustrates a user interface 700 presented on a display (e.g., the display 120 of FIG. 1), according to embodiments of the present disclosure. The user interface 700 shows various information and functionalities that relate to a video game. In an example, video game content 702 may be presented in a portion of the display. The user interface 700 may also display relevant activity cards on a portion of the user interface 700. Each activity card can be presented as a window, icon, or some other GUI element, include information about an activity, and can be selected to launch the activity or request help about the activity.

In one example, the video game has three relevant activities to a video game player. These and other activities may be determined based on one or more activities that the video game player is involved in in the video game or other applications available from the video game console and/or the video game platform. Accordingly, the user interface 700 displays three activity cards, each corresponding to one of the activities (illustrated in FIG. 7 as activity cards for Activity A 706, Activity B 708, and Activity C 710). In some cases, the user interface 700 may present an average or expected time in the activity card to assist with a user election of an activity card.

Figure 8:
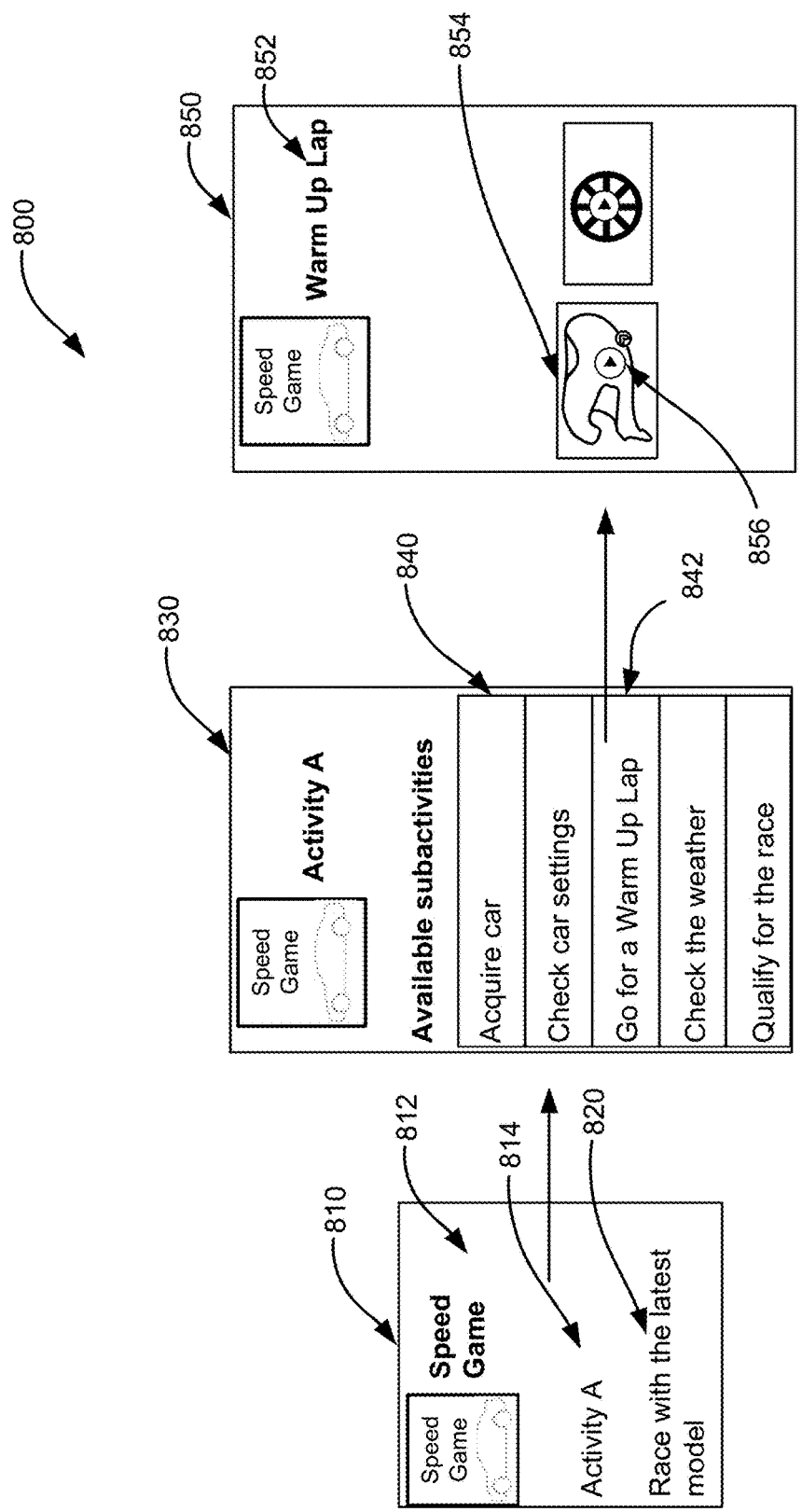
FIG. 8 illustrates an example of displaying video game help through a user interface, according to embodiments of the present disclosure.

FIG. 8 illustrates an example of displaying video game help through a user interface 800, according to embodiments of the present disclosure. Initially, the user interface presents an activity card 810 for an activity (e.g., corresponding to a selected activity card from the activity cards of FIG. 7). Upon a user interaction with the activity card 810, the user interface presents an expanded activity card 830 showing sub-activities of the activity. Upon a user interaction with a sub-activity, the user interface presents a help card 850 that includes links to video portions that show how the sub-activity can be played.

In one example, the activity card 810 includes a header section 812, an activity identifier 814, and an activity description 820 about the activity. In comparison, the expanded activity card 830 includes additional information related to the activity. In the example illustrated by FIG. 8, the expanded activity card 830 includes a list of some of the available sub-activities 840 available for completion by a video game player. The user interface may receive a selection of a sub-activity 842 within the expanded activity card 830. In the current example, the user interface 800 receives a selection of the sub-activity 842 "Go for a Warm Up Lap" from the list of sub-activities 840.

The user interface receives the selection of sub-activity 842 and displays the help card 850 including additional details and help specific to the sub-activity 842. The help card 850 includes a title 852 of the sub-activity 842, a video portion 854, and video playback controls 856. The organization of the title 852 and video portions can be similar to FIG. 6.

Figure 9:
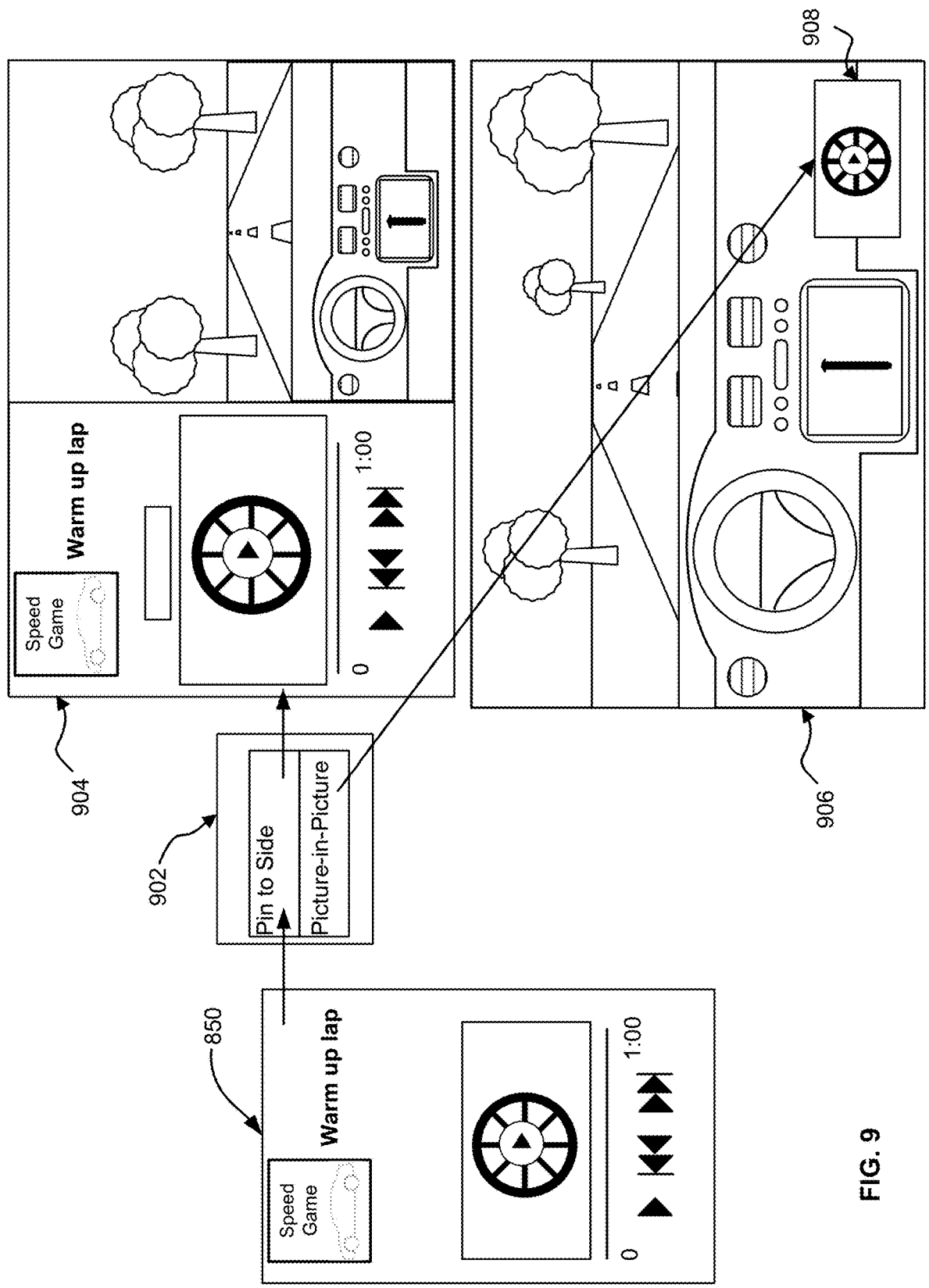
FIG. 9 illustrates examples of presenting video game help in a user interface, according to embodiments of the present disclosure.

FIG. 9 illustrates examples of presenting video game help in a user interface, according to embodiments of the present disclosure. In some embodiments, the user interface receives a selection of help card (e.g., the help card 850 of FIG. 8) and presents a configuration menu 902 of display configuration options. In some examples, a pin to side option from the configuration menu 902 corresponds to showing the help card 850 or a video portion from the help card 850 (e.g., the video portion 854 in a side-pane 904). If this option is selected, the user interface presents the help card 850 or the video portion in a window adjacent to the window showing video game content 906, while the execution of the video game continues. A picture-in-picture option from the configuration menu 902 corresponds to showing the help card 850 or the video portion, in a picture-in-picture 908 window, superimposed over the video game content 906. The video game content 906 may continue at normal or fractional speed while help information is presented in a pinned to side or picture-in-picture setting. Other presentations of the video card 950 or the video portion are possible. For instance, upon a particular user interaction with the video portion 854 (e.g., a double-click), the video portion is displayed using an expanded format (e.g., full screen). In this case, the video game content 906 may be paused.

Figure 10:
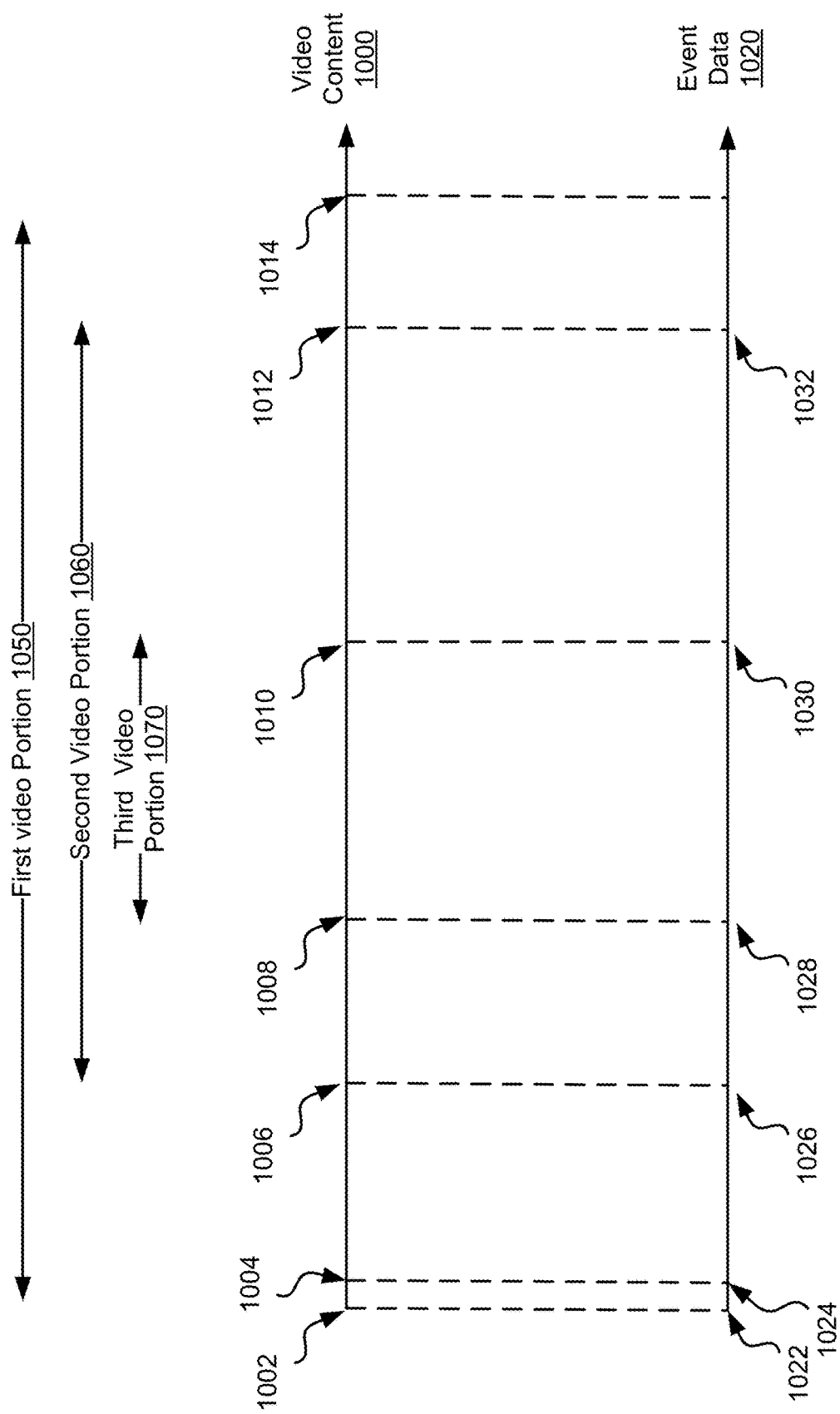
FIG. 10 illustrates an example of determining associations between portions of video content and activity identifiers, according to embodiments of the present invention.

FIG. 10 illustrates an example of determining associations between portions of video content and activity identifiers, according to embodiments of the present invention. For instance, the video game platform receives video content (e.g. a video segment or a full video file) showing multiple activities or sub-activities, each of which having a unique activity identifier. The video game platform, associates the activity identifiers with portions of the video content, and generates links to the portions of the video content.

In one example, the video game platform receives a video content 1000 from a video game console operated by a video game player. The video content 1000 includes a segment start 1002, various intermediate timestamps (timestamps 1004-1012, collectively "the timestamps" and each of which corresponding to a keyframe), and a segment end 1014. The video content 1000 may be of any length and may be recorded by the video game console and shows the game play of the video game player in a video game. The video game platform may also receive event data 1020 from the video game console corresponding to various events generated while the video game is being executed. The event data 1020 can include activity identifiers of activities played by the video game player in the video game, zone identifiers corresponding to areas of a game world of the video game where the activities were played, mechanic identifiers of mechanics used to play the activities, timing information (e.g., start and end) for each activity, presence in a zone, use of a mechanic, and other data related to the game play (e.g., outcomes of playing the activities, impacts of used mechanics, etc.).

The video game platform associates the identifiers of the activities, zones, and/or mechanics with the timestamps 1004-1012 (or the corresponding keyframes) to identify video portions of the video content 1000 where the corresponding activities, zones, and/or mechanics are shown. In the example illustrated by FIG. 10, the event data 1020 indicates a zone change 1024 (e.g., the video game player entered a particular zone), an Activity A start 1026, a first mechanic A1 change 1028 (e.g., the video game player changed to using a mechanic A1), a second mechanic change 1030, and an Activity A end 1032.

In this example, the video game platform identifies, among other things, a first video portion 1050 of the video content 1000 that showing the zone, a second video portion 1060 of the video content 1000 showing the Activity A, and a third video portion 1070 of the video content 1000 showing the mechanic A1. In particular, the video game platform determines that the zone change 1024 corresponds to the timestamp 1004 and, thus, sets the start of the first video portion 1050 to the timestamp 1004 (or the corresponding keyframe). Similarly, the video game platform determines that the Activity A start 1026 corresponds to the timestamp 1006 and that the activity A end 1032 corresponds to the timestamp 1012 and, thus, that the Activity A is shown in the video game content 1000 between the timestamps 1006 and 1012. Accordingly, the video game platform sets the start and the end of the second video portion 1060 to the timestamp 1006 and the timestamp 1012, respectively (or the corresponding keyframes). Further, the video game platform determines that the mechanic A1 is shown between the mechanic A1 change 1028 and the second mechanic change 1030 and that these events correspond to the timestamps 1008 and 1010, respectively. Accordingly, the video game platform sets the start and the end of the third video portion 1070 to the timestamp 1008 and the timestamp 1010, respectively (or the corresponding keyframes). For each of the video portions 1050-1070, the video game platform can generate links to the video game content 1000, where the link of a video portion identifies the start timestamp and the end timestamp (or, equivalently, the start keyframe and the end keyframe) for the video portion. The video game platform stores, in a data store (e.g., the data store 152 of FIG. 1), the associations between the different identifiers and timestamps, the start and end of each video portion and the associated identifier, the links, and/or metadata describing what each video portion shows.

The above example is provided for illustrative purposes. The embodiments of the present disclosure are not limited as such. In particular, the video game platform can associate video portions of the video game content with different activities, combinations of activities and a set of tasks of the activity (e.g., the sub-activities described in connection with FIG. 5), mechanics, zones, shown actors, shown targets, and/or any combination of objects defined in program code of the video game and for which events are received and stored.

Figure 11:
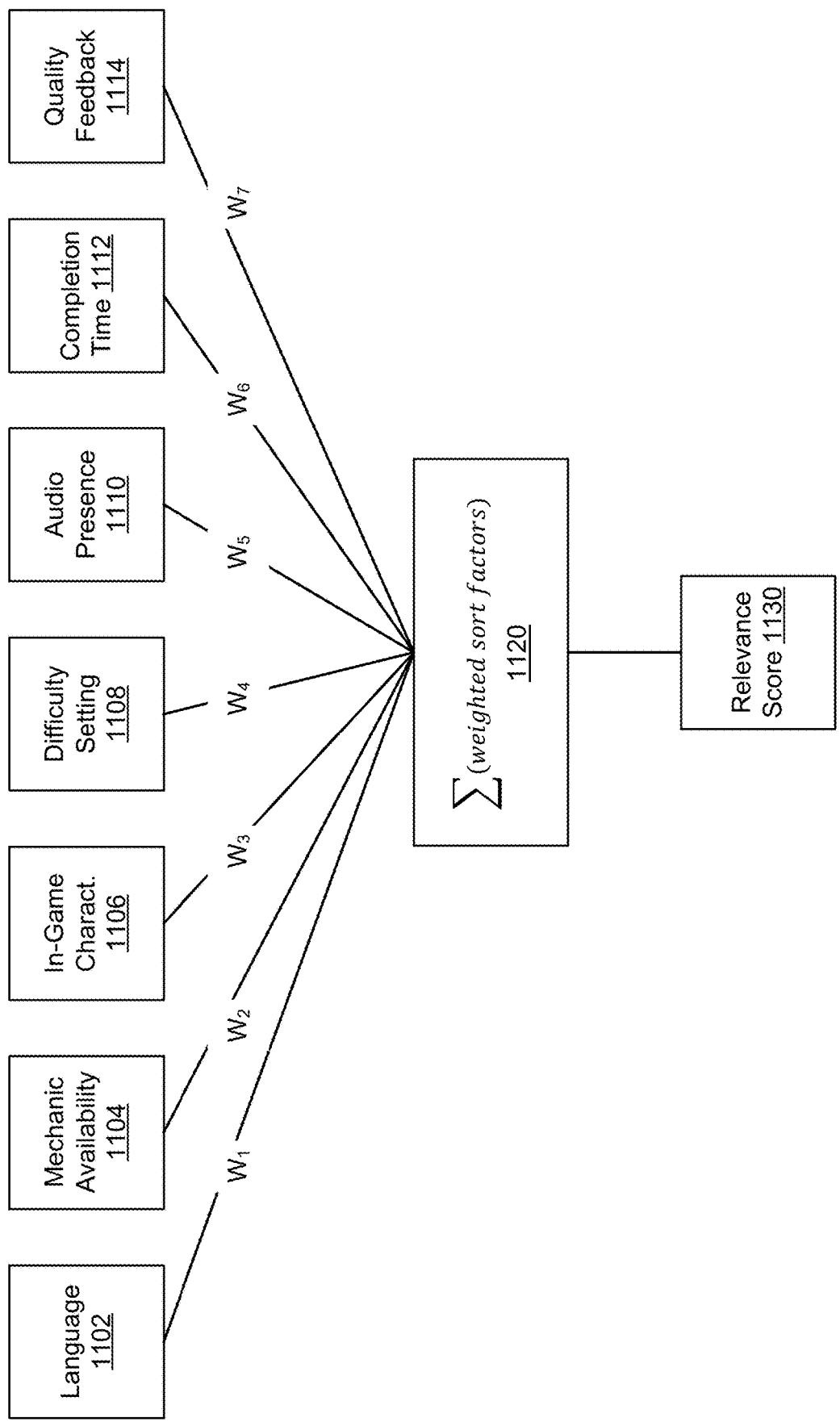
FIG. 11 illustrates an example of ranking of portions of video content, according to embodiments of the present disclosure.

FIG. 11 illustrates an example of ranking of portions of video content, according to embodiments of the present disclosure. In particular, a video game platform (e.g., the video game platform 150 of FIG. 1) processes event data stored in a data store (e.g., the event data 154 stored in the data store 152 of FIG. 1) to determine video portions of video content associated with activities not completed by a user, rank the video portions, and present the relevant video portions based on the ranking.

In an example, a user request for help with an activity is received. The user request can include the activity identifier. The video game platform uses the activity identifier in a look-up to a data store to determine video portions that are associated with the activity identifier. These video portions define a set of candidate video portions. In addition, the video game platform determines whether any video portion from the set includes a spoiler to the user (e.g., based on the event data as described in connection with spoiler blocks in FIG. 1). If a spoiler is included, the candidate video portion is removed from the set. The remaining set includes video portions that are then subject to the ranking and that are referred to herein as candidate video portions.

Each of the candidate video portions can be ranked according to a set of sort factors. These factors relate to other video game players, the user, context(s) of the other video game players and/or the user in an application (e.g., a video game application), and/or context(s) of the other video game players and/or the user on the video game platform. The ranking can involve generating a relevance score per candidate video portion content given how the sort factors are met and sorting the candidate video portions based on their relevance scores.

The highest ranked candidate video portions (e.g., the top three, or some other number,) can be identified to the user in the user interface. In particular, links to these video portions are sent to one or more computing devices of the user and presented thereat, as illustrated in connection with FIG. 7.

As illustrated in FIG. 11, the sort factors include language 1102, mechanic availability 1104, in-game characteristics 1106, difficulty setting 1108, audio presence 1110, completion time 1112, and quality feedback 1114. Each of these factors is described herein next. Of course, not all of the sort factors may be used. In addition, other sort factors related to generating candidate portions of video content based on event data can be defined and used.

In an example, the language 1102 is a sort factor indicating the likelihood of the user understanding the spoken language in a candidate video portion. As described above, the candidate video portion corresponds to video content of a video game player. Accordingly, the video portion can include a recording of audio corresponding to natural language utterances of the video game player. The higher the likelihood of the spoken language of the user matching the spoken language of the video game player, the higher the score for this sort factor is (e.g., referred to herein as a language score). In an example, the match between spoken languages is determined based on language settings of the user and the video game player.

In an example, the mechanic availability 1104 is a sort factor indicating the likelihood of the user's interest in using a mechanic shown in the candidate video portion. As described above, the candidate video portion can show a mechanic and be associated with the corresponding mechanic identifier. The video game platform can determine from an inventory associated with the user whether the inventory includes the mechanic identifier. If so, the score for this sort factor (e.g., referred to herein as a mechanic score) is increased. Further, the video game platform can analyze a history of the user's game play to determine the familiarity of the user with using the mechanic. The more familiar the user is (e.g., the more frequently the user has used the mechanic and/or the frequency of positive impact of the mechanic in the game play), the higher the mechanic score is.

In an example, the in-game characteristics 1106 is a sort factor indicating the likelihood of the user having in-game characteristics that match the in-game characteristics of the video game player. When the video content was recorded by the video game player, the video game player may have been playing the video game with certain in-game characteristics (e.g., at an expert level). If the user is requesting the video help while having matching in-game characteristics (e.g., the user is also playing the activity at the expert level), the score for this sort factor (e.g., referred to herein as an in-game characteristics score) can be set to high.

In an example, the difficulty setting 1108 is a sort factor indicating the likelihood of the user playing the activity at the same difficulty level as the video game player. When the video content was recorded by the video game player, the video game player may have been playing the video game at a certain difficulty setting. If the user is requesting the video help while playing the game at the same difficulty level, the score for this sort factor (e.g., referred to herein as a difficulty score) can be set to high.

In an example, the audio presence 1110 is a sort factor indicating whether the video portion includes microphone audio of the video game player. When the video content was recorded by the video game player, the video game player may have used a microphone. The resulting microphone audio captures natural language utterances of the video game player. If the microphone audio is included, the score for this sort factor is set to high (e.g., referred to herein as an audio score). Further, the higher the quality of this audio is, the higher the audio score is.

In an example, the completion time 1112 is a sort factor indicating the length of time used by the video game player to complete an activity shown in the candidate video portion. The completion time can be bounded by an upper limit and a lower limit. If outside this bounded range (e.g., too long or too short), the candidate video portion is scored low or even removed from the set of candidate video portions. If within the bounded range, the score for this score factor is set as a function (e.g., the inverse) of the length of time (e.g., referred to herein as a completion time score). The completion time can be estimated from the event data about the activity. For instance, the completion time is estimated as the time duration between the start and the end of the activity.

In an example, the helpfulness feedback 1114 is a sort factor indicating how helpful the candidate video portion is relative to an activity or a mechanic shown in the candidate video portion. In one illustration, the helpfulness feedback 1114 is based on user inputs of video game players that have viewed the candidate portion and performed the activity and/or used the mechanic. The user inputs can be received as an explicit rating (e.g., a number of stars from five stars, a number of likes, etc.). In this case, the score for this sort factor (e.g., referred to herein as a helpfulness score) is set as a function of the explicit rating (e.g., average star rating, ratio of likes to dislikes, etc.). In another example, the helpfulness score is generated from implicit feedback. The implicit feedback can be determined from event data of a plurality of video game players that viewed the candidate video portion and then performed the activity and/or used the mechanic. In particular, a success rate of viewing the candidate video portion and then successfully completing the activity or using the mechanic can be computed from the event data. The helpfulness score can be set as a function (e.g., proportional or equal) of the success rate. For instance, event data of a second video game player that has watched the candidate portion can be analyzed. If the event data indicates that this second video game player viewed the candidate video portion and immediately (e.g., following the end of this viewing, the event data shows that events about the activity and/or mechanic were received before any events about another activity and/or another mechanic) or within a predefined time duration (e.g., following this viewing, the event data shows that events about the activity and/or mechanic were received before the end of the predefined time duration, where events about another activity and/or mechanic may have also been received during the predefined time duration) performed the activity and/or used the mechanic and had a successful outcome and/or a positive impact, the helpfulness score is increased.

Each of the language score, mechanic score, in-game characteristics score, difficulty score, audio score, completion time score, and helpfulness score can be associated with a weight (illustrated in FIG. 11 as weights $W_i$, where "i" is between "1" and "7"). The weights can be predefined (e.g., based on a user setting such that the weights are personalized to the user; based on input of the video game developer) or set to default values.

A weighted sum 1120 of the individual scores of the sort factors can be computed, resulting in a total score. The total score can be set as a relevance score 1130. The relevance score 1130 can then be used to rank the candidate video portions relative to other candidate video portions.

Figure 12:
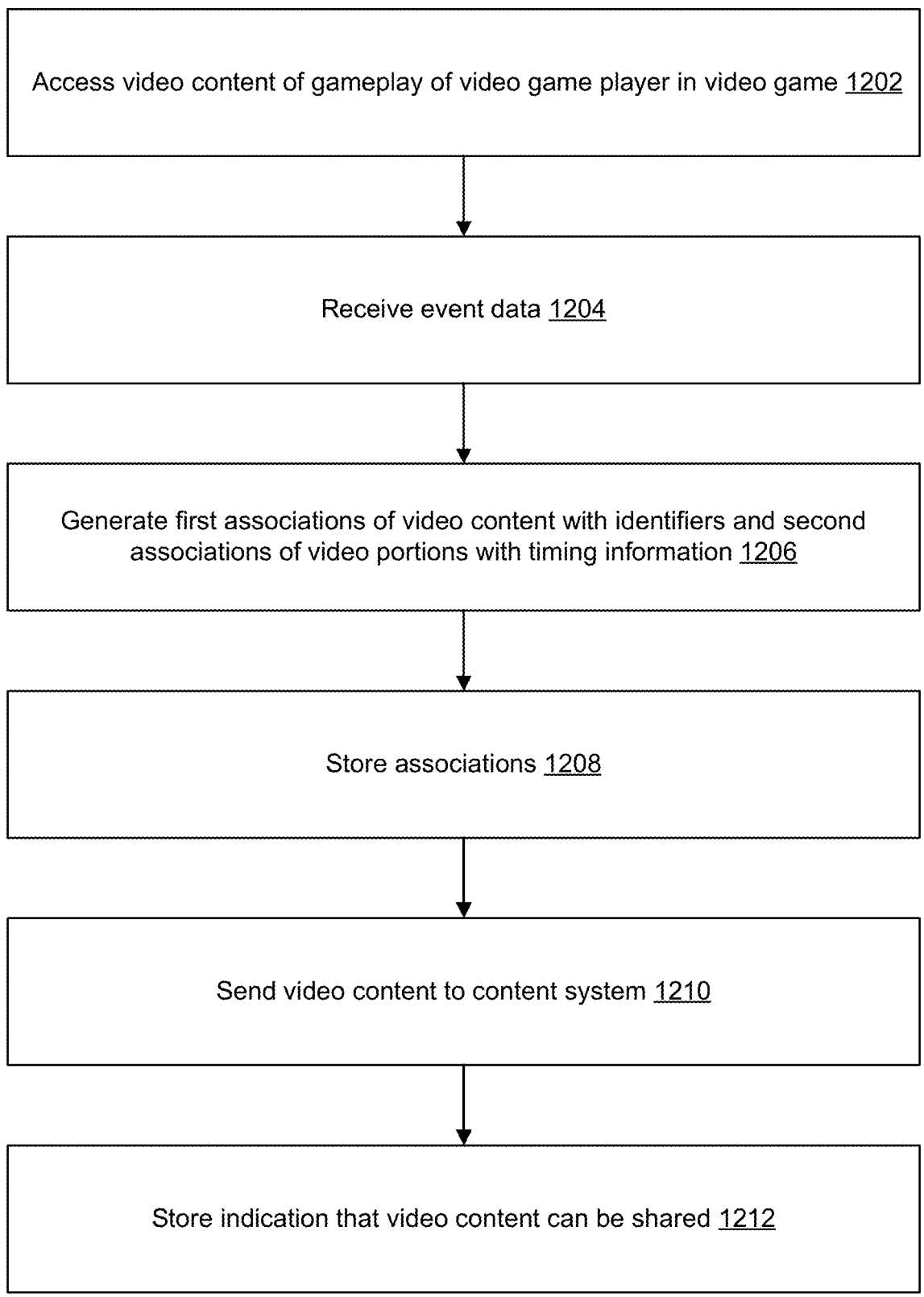
FIG. 12 illustrates an example of a flow for determining video portions showing objects from event data, according to embodiments of the present disclosure.
Figure 13:
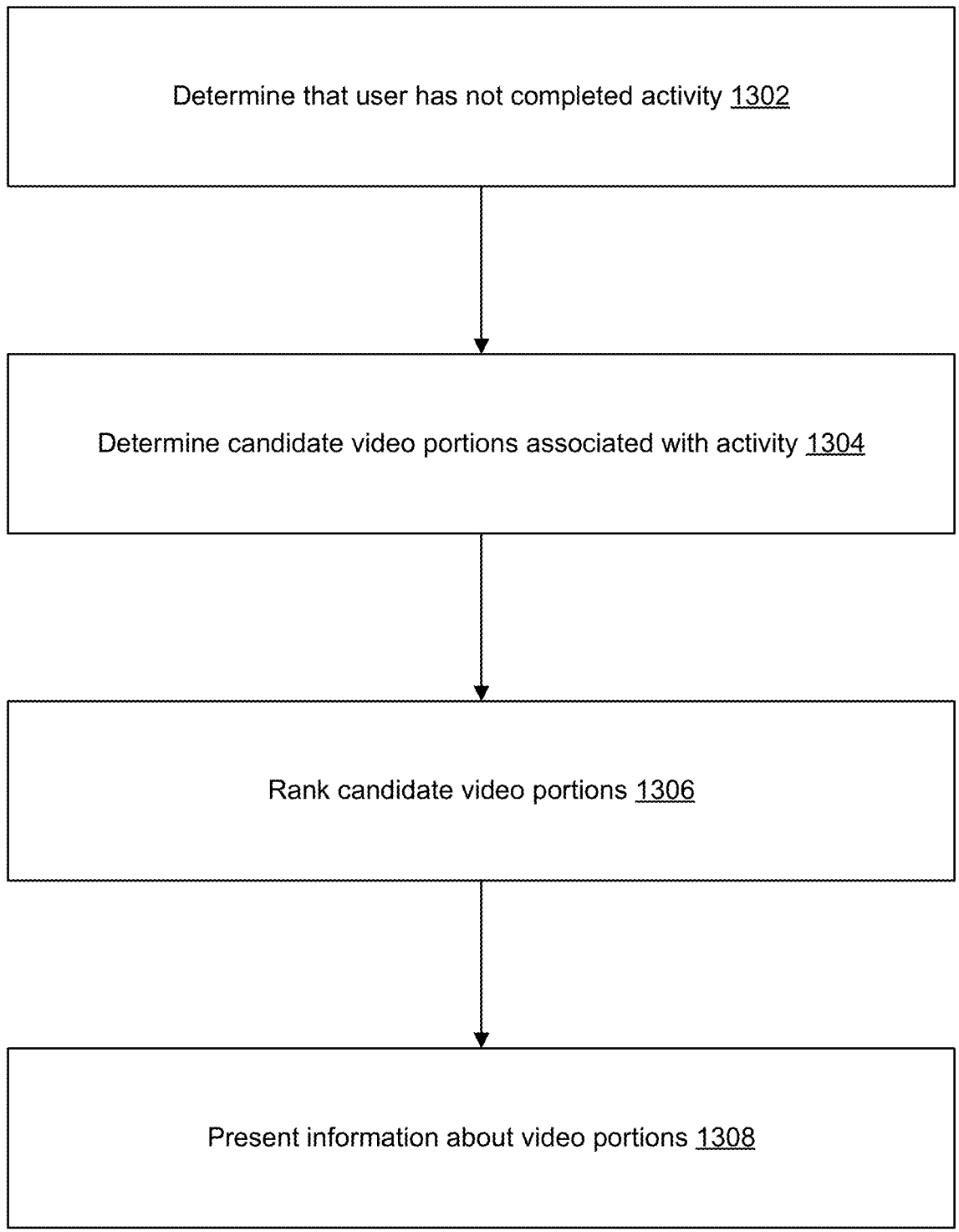
FIG. 13 illustrates another example of presenting a video portion of the video content as help assistance to a user, according to embodiments of the present disclosure.

FIGS. 12-13 illustrate example flows for providing video portions of video content as help assistance. The operations of the flows can be implemented as hardware circuitry and/or stored as computer-readable instructions on a non-transitory computer-readable medium of a computer system, such as a video game console and/or a video game platform. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is required and that certain operations can be omitted.

FIG. 12 illustrates an example of a flow for determining video portions showing objects from event data, according to embodiments of the present disclosure. The objects can be any of a zone, an activity, a mechanic, and/or any other objects described in connection with FIG. 1.

In an example, the flow includes operation 1202, where the computer system accesses video content of a game play of a video game player in a video game. For instance, the video game player may operate the video game console to play the video game. A game play record option can be presented on a user interface to the video game player. Upon a user selection of this option, the video game console can record video content showing the content and send this video game content to the video game platform and/or the video game platform can directly record this video content.

In an example, the flow includes operation 1204, where the computer system receives event data while recording the game play. The event data can include identifiers of the objects, indicate timing information and possible outcomes. For instance, the event data includes a zone identifier of a zone, an activity identifier, a mechanic identifier, a start of the activity corresponding to the activity identifier, an end of the activity, an outcome of the activity, a change to the mechanic corresponding to the mechanic identifier, an impact of using the mechanic, and a change to another mechanic.

In an example, the flow includes operation 1206, where the computer system generates first associations of the video content with the identifiers and second associations of the video portions with the timing information. For instance, the first associations indicate that the video content show the zone, the activity, and the mechanic. The second associations indicate the video portions that show the zone, the activity, and the mechanic. The various associations and resulting links can be generated as described in connection with FIG. 10 above.

In an example, the flow includes operation 1208, where the computer system stores the associations in a data store (e.g., the data store 152 of FIG. 1). For instance, the first and second associations are stored in connection with a user identifier that identifies the video game player and a video game identifier that identifies the video game.

In an example, the flow includes operation 1210, where the computer system sends the video content to a content system based on a request of the video game player to share the video content. For instance, the video content is uploaded to a third party system (e.g., the third party system 190 of FIG. 1) and/or stored in the data store.

In an example, the flow includes operation 1212, where the computer system stores, in the data store, an indication of the video content being shared. Because the video content is shared, this video content or video portions thereof can become candidate video content or candidate video portions usable to provide help assistance to other users. In other words, links to the video content and/or video portions can be provided to computing devices of such users based on the indication in the data store that the video content is shared.

FIG. 13 illustrates another example of presenting a video portion of the video content as help assistance to a user, according to embodiments of the present disclosure.

In an example, the flow includes operation 1302, where the computer system determines that the user has not completed an activity. For instance, event data stored in association with a user identifier of the user exclude an activity identifier of the activity.

In an example, the flow includes operation 1304, where the computer system determines video portions associated with the activity. For instance, the video portions are available from video content showing the game play of other video game players. The computer system uses the activity identifier to look-up the data store and identify the video portions based on the stored associations. The video portions that show the activity and do not include spoilers are added to a set of candidate video portion.

In an example, the flow includes operation 1306, where the computer system ranks the candidate video portions. For instance, a number of sort factors, such as the ones described in connection with FIG. 11, are used to generate a relevance score for each candidate video portion and the video portions are ranked according to their relevance scores.

In an example, the flow includes operation 1308, where the computer system presents information about the video portions. For instance, the top three (or some other number) ranked video portions are selected. The information about each the selected video portions includes a link to the video game portion and is sent to the video game console for presentation in a user interface, such as in the GUIs of FIGS. 6-9. In an illustration, each link to the top three ranked may be presented on each page within the user interface 604 of FIG. 6 and the order of the pages may be determined based on the rank of the video portions (e.g., the highest ranked video portion or link thereof may be presented on the first page, while the next ranked video portion or link thereof may be presented on the next page accessible via a user interaction with the selection bar 610). In another illustration, multiple links to the video portions may be displayed in a same page and presented in the order based on the ranking (e.g., the highest ranked video portion or link thereof may be presented in the left thumbnail of a series of thumbnail in the page).

Figure 14:
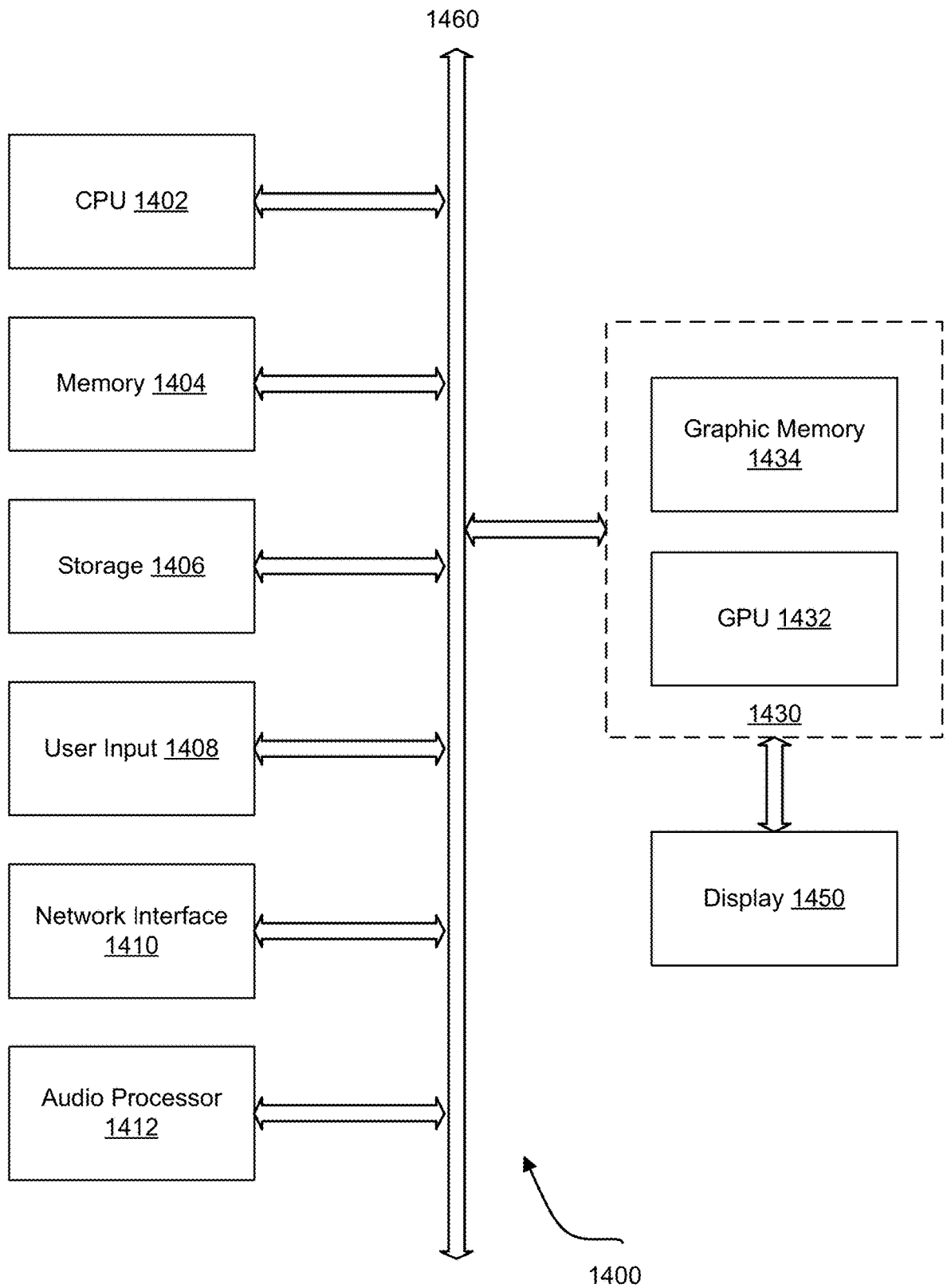
FIG. 14 illustrates an example of a hardware system suitable for implementing a computer system, according to embodiments of the present disclosure.

FIG. 14 illustrates an example of a hardware system suitable for implementing a computer system 1400, according to embodiments of the present disclosure. The computer system 1400 represents, for example, a video game console, a video game platform, or other types of a computer system. The computer system 1400 includes a central processing unit (CPU) 1402 for running software applications and optionally an operating system. The CPU 1402 may be made up of one or more homogeneous or heterogeneous processing cores. Memory 1404 stores applications and data for use by the CPU 1402. Storage 1406 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1408 communicate user inputs from one or more users to the computer system 1400, examples of which may include keyboards, mice, joysticks, touch pads, touch screens, still or video cameras, and/or microphones. Network interface 1410 allows the computer system 1400 to communicate with other computer systems via an electronic communications network, and may include wired or wireless communication over local area networks and wide area networks such as the Internet. An audio processor 1412 is adapted to generate analog or digital audio output from instructions and/or data provided by the CPU 1402, memory 1404, and/or storage 1406. The components of computer system 1400, including the CPU 1402, memory 1404, data storage 1406, user input devices 1408, network interface 1410, and audio processor 1412 are connected via one or more data buses 1460.

A graphics subsystem 1430 is further connected with the data bus 1460 and the components of the computer system 1400. The graphics subsystem 1430 includes a graphics processing unit (GPU) 1432 and graphics memory 1434. The graphics memory 1434 includes a display memory (e.g., a frame buffer) used for storing pixel data for each pixel of an output image. The graphics memory 1434 can be integrated in the same device as the GPU 1432, connected as a separate device with the GPU 1432, and/or implemented within the memory 1404. Pixel data can be provided to the graphics memory 1434 directly from the CPU 1402. Alternatively, the CPU 1402 provides the GPU 1432 with data and/or instructions defining the desired output images, from which the GPU 1432 generates the pixel data of one or more output images. The data and/or instructions defining the desired output images can be stored in the memory 1404 and/or graphics memory 1434. In embodiments, the GPU 1432 includes 3D rendering capabilities for generating pixel data for output images from instructions and data defining the geometry, lighting, shading, texturing, motion, and/or camera parameters for a scene. The GPU 1432 can further include one or more programmable execution units capable of executing shader programs.

The graphics subsystem 1430 periodically outputs pixel data for an image from the graphics memory 1434 to be displayed on the display device 1450. The display device 1450 can be any device capable of displaying visual information in response to a signal from the computer system 1400, including CRT, LCD, plasma, and OLED displays. The computer system 1400 can provide the display device 1450 with an analog or digital signal.

In accordance with various embodiments, the CPU 1402 is one or more general-purpose microprocessors having one or more processing cores. Further embodiments can be implemented using one or more CPUs 1402 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process, which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 66%, 155%, 80%, 90%, 95%, 99%, 99.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method implemented by a computer system, the method including:
    accessing first video content of a first game play of a first video game player in a video game, wherein the first video content is associated in a data store with an identifier of an activity completed by the first video game player in the video game and with data indicating an outcome of completing the activity, wherein the identifier of the activity is included in program code of the video game;
    accessing second video content of a second game play of a second video game player in the video game, wherein the second video content is associated in the data store with the identifier of the activity;
    receiving an event generated by the program code of the video game indicating that the outcome is a successful completion of the activity;
    determining, from a definition of the activity in the program code of the video game and through a hierarchy, that the activity is a parent of sub-activities;
    generating information about the activity and sub-activities, wherein the information includes links to video portions of the first video content and the second video content, wherein the video portions correspond to the sub-activities as shown in the first video content and the second video content; and
    presenting the information in a user interface to a user, wherein upon selection by the user of a first link of the links associated with a first sub-activity of the sub-activities, the user interface displays the first video content to the user starting at a first video portion showing a completion of the first sub-activity by the first video game player and an option to view the second video content starting at a second video portion showing a completion of the first sub-activity by the second video game player.

2. The method of claim 1, further including:
    recording the first game play of the first video game player as the first video content;
    while recording the first game play, receiving one or more events that include the identifier, a start of the activity, an end of the activity, and the outcome;
    generating one or more associations of the first video content with the identifier and of the video portions of the first video content with the start and the end; and
    storing the one or more associations in the data store.

3. The method of claim 2, further including:
    sending the first video content to a content system based on a request of the first video game player to share the first video content; and
    storing, in the data store, an indication of the first video content being shared, wherein the links are included in the information based on the indication.

4. The method of claim 3, wherein the information is presented in a window over video game content of the video game, and further including:
    receiving a user selection of the links presented in the window; and
    receiving the first video content from the content system based on the user selection.

5. The method of claim 4, further including:
    presenting the first video content of the first game play over the video game content of the video game.

6. The method of claim 4, wherein the window further includes at least one of: (i) a first option to present the first video content of the first game play adjacent to and simultaneously with a presentation of the video game content of the video game, or (ii) a second option to present the first video content of the first game play in a picture-in-picture window over and simultaneously with the presentation of the video game content of the video game.

7. The method of claim 4, wherein the window further includes a map that corresponds to a zone within the video game, wherein the map indicates an estimated position of where a plurality of video game players completed the activity within the zone.

8. The method of claim 4, wherein the window further includes information about using a mechanic to complete the activity based on a history of use of the mechanic by a plurality of video game players.

9. A computer system including:
    one or more processors; and
    one or more memories storing computer-readable instructions that, upon execution by the one or more processors, configure the computer system to:
        access first video content of a first game play of a first video game player in a video game, wherein the first video content is associated in a data store with an identifier of an activity completed by the first video game player in the video game and with data indicating an outcome of completing the activity, wherein the identifier of the activity is included in program code of the video game;
        accessing second video content of a second game play of a second video game player in the video game, wherein the second video content is associated in the data store with the identifier of the activity;
        receive an event generated by the program code of the video game indicating that the outcome is a successful completion of the activity;
        determine, from a definition of the activity in the program code of the video game and through a hierarchy, that the activity is a parent of sub-activities;
        generate information about the activity and sub-activities, wherein the information includes links to video portions of the first video content and the second video content, wherein the video portions correspond to the sub-activities as shown in the first video content and the second video content; and
        present the information in a user interface to a user, wherein upon selection by the user of a first link of the links associated with a first sub-activity of the sub-activities, the user interface displays the first video content to the user starting at a first video portion showing completion of the first sub-activity by the first video game player and an option to view the second video content starting at a second video portion showing a completion of the first sub-activity by the second video game player.

10. The computer system of claim 9, wherein the execution of the computer-readable instructions further configure the computer system to:
    rank the first video content relative to one or more other video contents that show the activity, wherein the first video content is ranked based on a language setting of the first video game player and a language setting of the user; and
    select the first video content to be included in the information based on the ranking.

11. The computer system of claim 9, wherein the video portions of the first video content shows a use of a mechanic by the first video game player to complete the activity, and wherein the execution of the computer-readable instructions further configure the computer system to:
rank the first video content relative to one or more other video contents that show the activity, wherein the first video content is ranked based on an availability of the mechanic to the user.

12. The computer system of claim 9, wherein the execution of the computer-readable instructions further configure the computer system to:
rank the first video content relative to one or more other video contents that show the activity, wherein the first video content is ranked based on a characteristic of the first video game player in the video game and a characteristic of the user in the video game.

13. The computer system of claim 9, wherein the execution of the computer-readable instructions further configure the computer system to:
rank the first video content relative to one or more other video contents that show the activity, wherein the first video content is ranked based on a difficulty setting associated with the first game play of the first video game player in the video game and a difficulty setting associated with a game play of the user in the video game.

14. The computer system of claim 10, wherein the first video content indicates a completion time of the activity by the first video game player, and wherein the execution of the computer-readable instructions further configure the computer system to:
rank the first video content relative to one or more other video contents that show the activity, wherein the first video content is ranked based on the completion time.

15. The computer system of claim 9, wherein the execution of the computer-readable instructions further configure the computer system to:
rank the first video content relative to one or more other video contents that show the activity, wherein the first video content is ranked based on microphone audio of the first video game player being available with the first video content.

16. The computer system of claim 9, wherein the execution of the computer-readable instructions further configure the computer system to:
determine a success rate of the first video content, wherein the success rate is determined by at least:
receiving, after a presentation of the first video content to a third video game player and before receipt of another identifier of a different activity completed by the third video game player in the video game, second data including the identifier of the activity and indicating a successful completion of the activity by the third video game player, and
updating the success rate based on the second data; and
rank the first video content relative to one or more other video contents that show the activity, wherein the first video content is ranked based on the success rate.

17. One or more non-transitory computer-readable storage media storing instructions that, upon execution on a computer system, cause the computer system to perform operations including:
accessing first video content of a first game play of a first video game player in a video game, wherein the first video content is associated in a data store with an identifier of an activity completed by the first video game player in the video game and with data indicating an outcome of completing the activity, wherein the identifier of the activity is included in program code of the video game;
accessing second video content of a second game play of a second video game player in the video game, wherein the second video content is associated in the data store with the identifier of the activity;
receiving an event generated by the program code of the video game indicating that the outcome is a successful completion of the activity;
determining, from a definition of the activity in the program code of the video game and through a hierarchy, that the activity is a parent of sub-activities;
generating information about the activity and sub-activities, wherein the information includes links to video portions of the first video content and the second video content, wherein the video portions correspond to the sub-activities as shown in the first video content and the second video content; and
presenting the information in a user interface to a user, wherein upon selection by the user of a first link of the links associated with a first sub-activity of the sub-activities, the user interface displays the first video content to the user starting at a first video portion showing a completion of the first sub-activity by the first video game player and an option to view the second video content starting at a second video portion showing a completion of the first sub-activity by the second video game player.

18. The one or more non-transitory computer-readable storage media of claim 17, wherein the activity is a task from a plurality of tasks that form a second activity, wherein the operations further include:
presenting, in the user interface, a window in a first state, the window identifying the second activity and presented over video game content of the video game;
presenting the window in an expanded state upon a user selection of the second activity, the window in the expanded state identifying the tasks of the second activity; and
updating the window in the expanded state to show the information about the activity upon a user selection of the activity from the tasks of the second activity.

19. The one or more non-transitory computer-readable storage media of claim 18, wherein the window is updated to further show at least one of (i) a map within a zone of the video game to complete the activity or (ii) second information about using a mechanic to complete the activity, wherein the at least one of (i) the map or (ii) the second information are shown simultaneously with the links to the video portions of the first video content and the second video content.

* * * * *